(12) United States Patent
Yoshida et al.

(10) Patent No.: US 6,449,063 B1
(45) Date of Patent: Sep. 10, 2002

(54) FACSIMILE APPARATUS

(75) Inventors: Takehiro Yoshida, Tokyo; Fumiyuki Takiguchi, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,189

(22) Filed: Jun. 29, 1999

(30) Foreign Application Priority Data

Jun. 30, 1998 (JP) .......................................... 10-199571

(51) Int. Cl.[7] .................................................. H04N 1/00
(52) U.S. Cl. ........................... 358/400; 358/435; 399/2; 399/374
(58) Field of Search ................................. 358/400, 401, 358/468, 434, 435, 436, 474, 296; 399/2, 374, 1

(56) References Cited

U.S. PATENT DOCUMENTS

| | | | | |
|---|---|---|---|---|
| 5,282,050 A | * | 1/1994 | Ishizuka et al. | 358/400 |
| 5,289,290 A | * | 2/1994 | Suzuki et al. | 358/468 |
| 5,408,340 A | * | 4/1995 | Edamura | 358/468 |
| 5,532,847 A | * | 7/1996 | Maruyama | 358/498 |
| 5,642,205 A | * | 6/1997 | Kassmann | 358/436 |
| 5,815,289 A | | 9/1998 | Yoshida et al. | 358/468 |
| 5,826,133 A | * | 10/1998 | Saito et al. | 399/2 |
| 6,275,308 B1 | * | 8/2001 | Yoshida | 358/474 |

* cited by examiner

*Primary Examiner*—Kimberly A. Wlliams
(74) *Attorney, Agent, or Firm*—Fitzpatrick, Cella, Harper & Scinto

(57) ABSTRACT

The invention provides a facsimile apparatus which can perform the re-transmitting operation adapted to receive reception data in a good state on the reception side upon error re-transmission when a both-side document sheet is transmitted. At the time of a facsimile communication, the presence or absence of a both-side reception function is notified from a receiver to a transmitter and the both-side document sheet is designated by a DCS signal from the transmitter to the receiver. When the both-side document sheet is designated by the DCS signal, the front side and the reverse side are sequentially transmitted. When shifting to a one-side document sheet in the middle of the page, the one-side document sheet is designated by the DCS signal by returning to phase B. When the one-side document sheet is designated by the DCS signal and transmitted and the sheet is shifted to the both-side document sheet in the middle of the page, the both-side document sheet is designated by the DCS signal by returning to phase B and, thereafter, the front side and the reverse side are sequentially transmitted. As for the error re-transmission when an error occurs during the communication, the re-transmission from the front side is always performed upon transmission of the both-side document sheet.

18 Claims, 23 Drawing Sheets

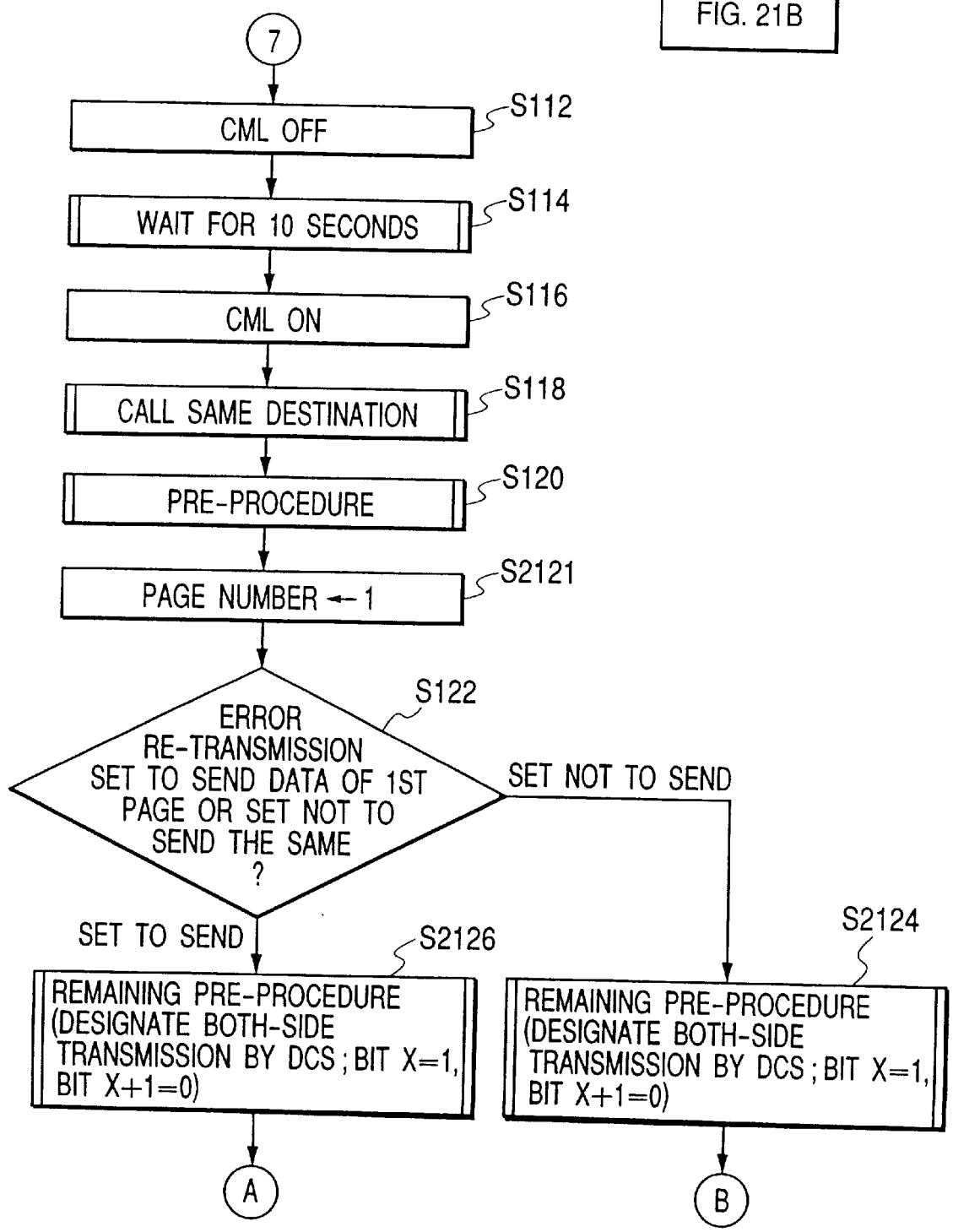

FACSIMILE APPARATUS

BACKGROUND OF THE INVENTION

1. Field of the Invention

The invention relates to a facsimile apparatus which can perform a both-side transmission.

2. Related Background Art

In a conventional facsimile apparatus which can transmit a one-side document sheet, as a re-transmitting operation when an error occurs during a communication, a re-transmission from a page in which the error occurred is executed.

There is, consequently, the following drawback. That is, in the case where an error re-transmission is executed at the time of transmission of a both-side document sheet, for example, if a communication error occurs during the transmission of the reverse side of the both-side document sheet and an error re-transmission is executed, data of the reverse side of the error re-transmitted document sheet is recorded onto the front side of a recording paper. If the reception document sheet in which the error occurred and the reception document sheet which was error re-transmitted are tried to be coupled on the receiver side, the reverse side becomes a blank paper during the operation or the printing is performed up to the midway, and the reception document sheet becomes hard to be seen.

SUMMARY OF THE INVENTION

It is, therefore, an object of the invention to provide a facsimile apparatus which can perform a re-transmitting operation for enabling reception data to be received in a good state on the reception side even upon error re-transmission when a both-side document sheet is transmitted.

DETAILED DESCRIPTION OF THE PREFERRED EMBODIMENTS

Embodiment 1

Figure 1:
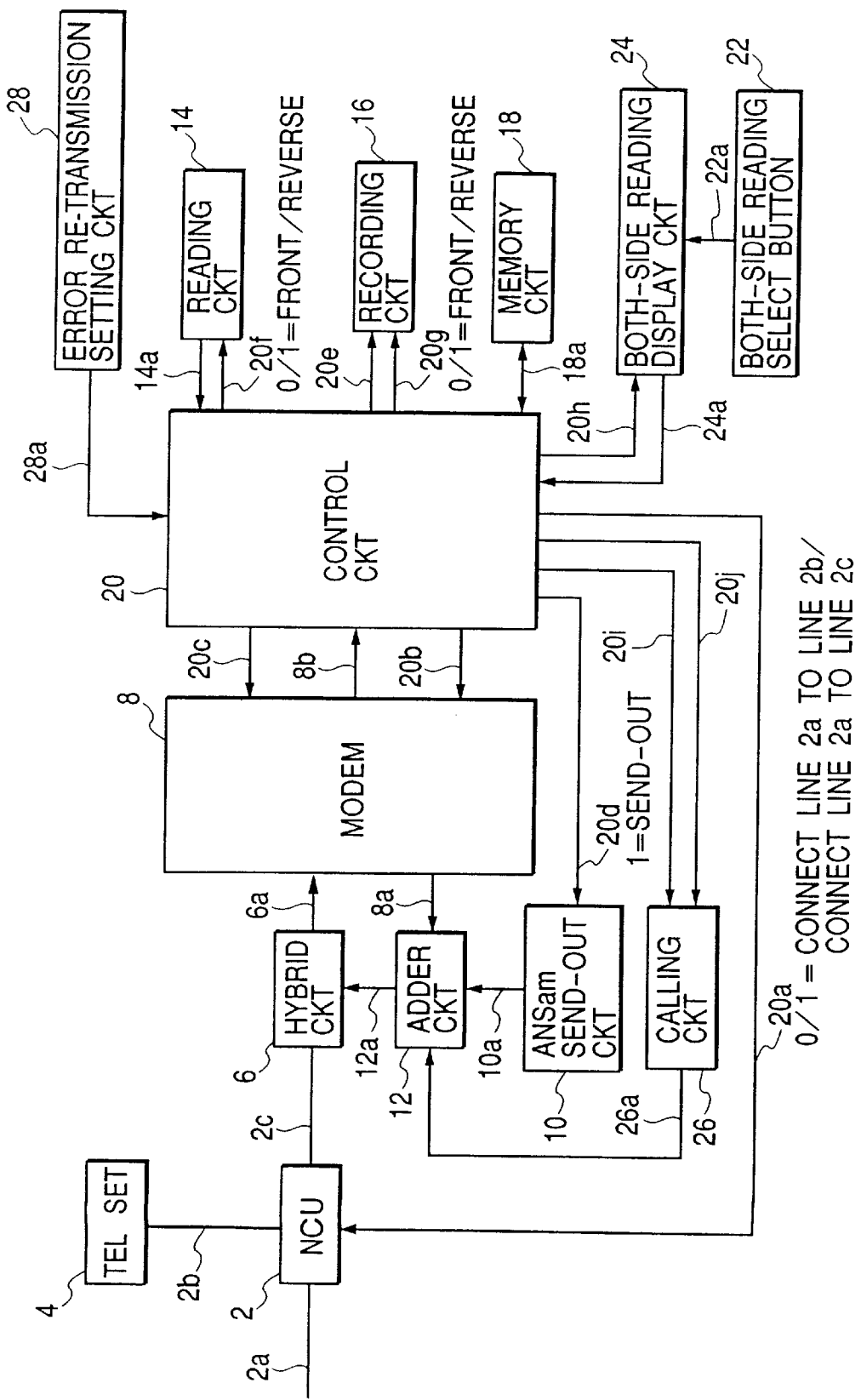
FIG. 1 is a block diagram showing an embodiment of the invention.

FIG. 1 is a block diagram showing a construction of a facsimile apparatus according to an embodiment of the invention. The facsimile apparatus according to the embodiment 1 has a construction such that a both-side reading, a both-side transmission, and a both-side recording of document sheet data can be performed.

First, to use a telephone network for a data communication or the like, an NCU (network control unit) 2 is connected to a terminal of its telephone line, performs a connection control of a telephone exchange network, switches to a data communication path, and holds a loop. If a signal level (signal line 20a) from a control circuit 20 is equal to "0", a telephone line 2a is connected to a telephone set 4 side. If the signal level is equal to "1", the telephone line 2a is connected to a facsimile apparatus side. In a normal state, the telephone line 2a is connected to the telephone set 4 side.

A hybrid circuit 6 separates a signal of a transmission system and a signal of a reception system, sends a transmission signal from an adder circuit 12 to the telephone line 2a via the NCU 2, receives a signal from a partner side via the NCU 2, and transmits it to a modem 8 via a signal line 6a.

The modem 8 performs a modulation and a demodulation based on ITU-T recommendation V.8, V.21, V.27ter, V.29, V.17, and V.34, and each transmission mode is designated by a signal line 20c. The modem 8 inputs a signal outputted onto a signal line 20b, outputs modulation data to a signal line 8a, inputs the reception signal outputted to the signal line 6a, and outputs demodulation data onto a signal line 8b.

An ANSam send-out circuit 10 is a circuit to send out an ANSam signal. When the signal at the signal level "1" is outputted to a signal line 20d, the ANSam send-out circuit 10 sends out the ANSam signal to a signal line 10a. When the signal at the signal level "0" is outputted to the signal line 20d, the ANSam send-out circuit 10 sends out no signal to the signal line 10a.

The adder circuit 12 inputs data on the signal line 8a, data on the signal line 10a, and data on a signal line 26a and outputs an addition result to a signal line 12a.

When the signal at the signal level "0" is outputted to a signal line 20f, a reading circuit 14 reads out data on the front side. When the signal at the signal level "1" is outputted to the signal line 20f, the reading circuit 14 reads out data on the reverse side. The reading circuit 14 outputs the read data to a signal line 14a.

When the signal at the signal level "0" is outputted to a signal line 20g, a recording circuit 16 sequentially records data outputted to a signal line 20e onto the front side of the recording paper every line. When the signal at the signal level "1" is outputted to the signal line 20g, the recording circuit 16 sequentially records data outputted to the signal line 20e onto the reverse side of the recording paper every line.

A memory circuit 18 is used to store raw data of the read data or coded data, or store received data, decoded data, or the like.

A both-side reading select button 22 is a button to select the both-side reading in the reading circuit 14. When the button 22 is depressed, a depression pulse is generated to a signal line 22a.

A both-side reading display circuit 24 is a circuit to display the execution of the both-side reading. When a clear pulse is generated on a signal line 20h, the display circuit 24 displays nothing. After that, each time the depression pulse is generated to the signal line 22a, "display"→"not display"→"display" are repeated. At the time of "display", the signal at the signal level "1" is outputted to a signal line 24a. At the time of "not display", the signal at the signal level "0" is outputted to a signal line 24a.

A calling circuit 26 inputs data outputted to a signal line 20j and outputs a select signal of DTMF to the signal line 26a when a call command pulse is generated to a signal line 20i.

An error re-transmission setting circuit 28 is a circuit to set an error re-transmission mode. When a second mode to re-transmit from the error page is selected, the setting circuit 28 outputs the signal at the signal level "0" to a signal line 28a. When a first mode to re-transmit data of a document sheet of the first page and data from the error page is selected, the setting circuit 28 outputs the signal at the signal level "1" to the signal line 28a.

The control circuit 20 controls the whole facsimile apparatus of the embodiment and, particularly, executes the following control in the embodiment.

First, upon communication of the facsimile, the presence or absence of the both-side reception function is notified by a DIS signal from a receiver to a transmitter and a both-side document sheet is designated from the transmitter to the receiver by a DCS signal. When the both-side document sheet is designated, document images are transmitted in accordance with the order from the front side to the reverse side. In case of changing the document sheet to a one-side document sheet in the middle of the page, an operating phase is returned to phase B and the one-side document sheet is designated by a DCS signal.

On the other hand, when the one-side document sheet is designated by the DCS signal and the image signal is transmitted and the document sheet is changed to the both-side document sheet in the middle of the page, the operating phase is returned to phase B. The both-side document sheet is designated by the DCS signal and, after that, the document images are transmitted in accordance with the order from the front side to the reverse side.

As for the error re-transmission when an error occurs during the communication, the re-transmission is always executed from the front side at the time of transmission of the both-side document sheet. That is, the error re-transmission is executed from the front side of the document sheet of, particularly, the n-th page even in an error during the transmission of the front side of the document sheet of the n-th page or an error during the transmission of the reverse side of the document sheet of the n-th page.

Further, upon setting of the error re-transmission, if the re-transmission (second mode) from the page in which an error occurred is selected on the basis of the selection by the setting circuit 28, the error re-transmission is executed as it is. When the re-transmission (first mode) from the document sheet of the first page and the page in which an error occurred is selected, the one-side document sheet is first designated by the DCS signal, the transmission of the document sheet of the first page is executed, the operating phase is subsequently returned to phase B, the both-side document sheet is designated by the DCS signal, and the error re-transmission is executed after that.

FIGS. 2 to 9 are flowcharts showing a flow of control of the control circuit 20.

Figure 2:
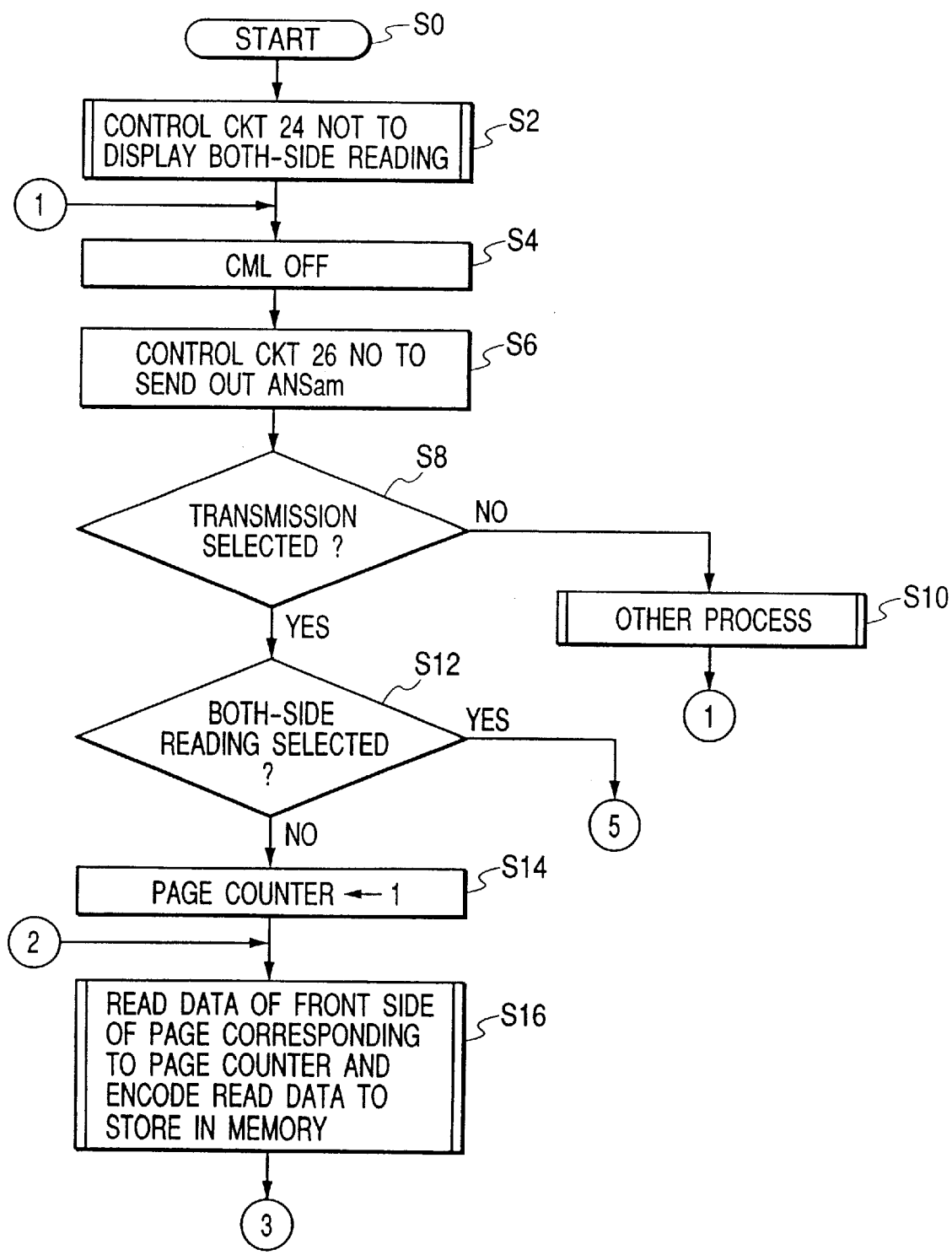
FIG. 2 is a flowchart showing the operation in the embodiment.

In FIG. 2, the operation is started in step S0. A clear pulse is generated to the signal line 20h and the both-side reading display circuit 24 is not displayed in step S2. The signal at the signal level "0" is outputted to the signal line 20a and the CML is turned off in step S4. The signal at the signal level "0" is outputted to the signal line 20d and no ANSam signal is transmitted in step S6.

Whether the transmission has been selected or not is discriminated in step S8. When it is selected, step S12 follows. When it is not selected, step S10 follows and another process is performed.

The data on the signal line 24a is inputted and whether the both-side reading mode has been selected or not is discriminated in step S12. When it is selected, step S68 follows. When it is not selected, step S14 follows. "1" is set into a page counter in step S14. The data on the front side of one page is read out in correspondence to a count value of the page counter and encoded and stored into a memory in step S16.

The presence or absence of a next document sheet is discriminated in step S18. If there is the next document sheet, step S20 follows and the count value of the page counter is increased by "1". Step S16 follows. If there is not a next document sheet, step S22 follows, the signal at the signal level "1" is outputted to the signal line 20a, and the CML is turned on.

The designated destination is called by the calling circuit 26 in step S24. A pre-procedure is executed in step S26. The one-side transmission is now designated by the DCS signal. "1" is set into a transmission page counter in step S28. Page data of the transmission page counter is transmitted in step S30.

Whether a communication error has occurred or not is discriminated in step S32. If no communication error occurs, step S34 follows. If the communication error has occurred, step S42 follows. The presence or absence of a next page is discriminated in step S34. If there is the next page, step S36 follows. If NO, step S40 follows.

A mid-procedure is executed in step S36. The count value of the transmission page counter is increased by "1" in step S38 and step S30 follows.

A post-procedure is executed in step S40 and step S4 follows.

The signal at the signal level "0" is outputted to the signal line 20a and the CML is turned off in step S42. The apparatus waits for 10 seconds in step S44. The signal at the signal level "1" is outputted to the signal line 20a and the CML is turned on in step S46.

The same destination as the destination called in step S24 is called by the calling circuit 26 in step S48. A pre-procedure is executed and the one-side transmission is designated by the DCS signal in step S50.

The data on the signal line 28a is subsequently inputted and whether the error re-transmission has been set or not is discriminated in step S52. When the mode to send the document sheet of the first page is set, step S54 follows and the data of the first page is transmitted. The processing routine advances to step S58 via a mid-procedure in step S56. When the mode not to send the data of the document sheet of the first page is set, step S58 directly follows.

The data of the page of the transmission page counter is transmitted in step S58. The presence or absence of a next page is discriminated in step S60. When there is the next page, step S64 follows and the mid-procedure is executed. The count value of the transmission page counter is increased (incremented) by "1" in step S66 and step S58 follows. If there is not the next page, step S62 follows and a post-procedure is executed and step S4 follows.

"1" is set into the count value of the page counter in step S68. The front side is set to the document sheet side in step S70. The data of one page is read out in correspondence to the count value of the page counter and the document sheet side and encoded and stored into the memory in step S72.

Whether the document sheet side is the front side or not is discriminated in step S74. If it is the front side, step S76 follows and the reverse side is set to the document sheet side and step S72 follows. If it is the reverse side, step S78 follows and the presence or absence of a next document sheet is discriminated. If there is the next document sheet, step S80 follows, the count value of the page counter is increased by "1", and step S70 follows. If NO, step S82 follows.

The signal at the signal level "1" is outputted to the signal line 20a and the CML is turned on in step S82. The designated destination is called by using the calling circuit 26 in step S84.

A pre-procedure is subsequently executed in step S86. Whether the partner station has the both-side transmission function or not is discriminated in step S88. If YES, step S90 follows. If NO, step S148 follows.

A remaining pre-procedure is executed and the both-side transmission is designated by the DCS signal in step S90. "1" is subsequently set into the transmission page counter in step S92. The front side is set to the document sheet side in step S94.

The data of page corresponding to the transmission page counter and the document sheet side is transmitted in step S96. Whether an error has occurred or not is discriminated in step S98. If no error occurs, step S100 follows. If the error occurred, step S112 follows.

Whether the document sheet side is the front side or not is discriminated in step S100. If it is the front side, step S102 follows and the reverse side is set to the document sheet side. Step S96 follows via a mid-procedure in step S103. When the document sheet side is the reverse side, step S104 follows and the presence or absence of a next page is discriminated. If there is the next page, step S108 follows and a mid-procedure is executed. The count value of the transmission page counter is increased by "1" in step S110 and step S94 follows. If NO, step S106 follows, a post-procedure is executed, and step S4 follows.

The signal at the signal level "0" is outputted to the signal line 20a and the CML is turned off in step S112. The apparatus waits for 10 seconds in step S114. The signal at the signal level "1" is outputted to the signal line 20a and the CML is turned on in step S116.

The same destination as that called in step S84 is subsequently called by using the calling circuit 26 in step S118. A pre-procedure is executed in step S120. The data on the signal line 28a is inputted and whether the error re-transmission has been set or not is discriminated in step S122. If the mode to also send the data of the first page has been set, step S126 follows and a remaining pre-procedure to designate the one-side transmission by the DCS signal is executed. The data of the front side of the first page is transmitted in step S128. A mid-procedure is executed in step S130. The operating phase is returned to phase B and the both-side transmission is designated by the DCS signal. After that, step S132 follows.

When the mode not to send the data of the first page is set in step S122, step S124 follows and a remaining pre-procedure to designate the both-side transmission by the DCS signal is executed. After that, step S132 follows.

The front side is set to the document sheet side in step S132. The data of the page of the transmission page counter and the document sheet side are transmitted in step S134.

Whether the document sheet side is the front side or not is discriminated in step S136. If it is the front side, step S138 follows and the reverse side is set to the document sheet side. A mid-procedure is executed in step S139 and step S134 follows. If it is the reverse side, step S140 follows and the presence or absence of a next page is discriminated. If there is the next page, step S144 follows and a mid-procedure is executed. The count value of the transmission page counter is increased by "1" in step S146 and step S132 follows. If NO, step S142 follows, a post-procedure is executed, and step S4 follows.

A remaining pre-procedure is executed and the one-side transmission is designated by the DCS signal in step S148. A control similar to that in the foregoing steps S92 to S118 is subsequently executed in step S150. After the execution of step S118, the processing routine advances to next step (S152). After the execution in step S106, step S4 follows.

A pre-procedure is executed and the one-side transmission is designated by the DCS signal in step S152. If the mode to also send the data of the first page is set in step S154 in the same control as that in step S122, the processing routine advances to step S156. If the mode not to send the data of the first page is set, step S160 follows.

A process (transmission of the data of the front side of the first page) similar to that in step S128 mentioned above is executed in step S156. A mid-procedure is executed in step S158 and step S160 follows.

The process (transmission of the data of the page of the transmission page counter and the document sheet side) in step S134 mentioned above is executed in step S160. The process (to discriminate whether the document sheet side is the front side or not) in step S136 mentioned above is executed in step S162. If NO (the document sheet side is the reverse side) in step S162, step S166 follows and the discrimination in step S140 is performed. If YES (the document sheet side is the front side) in step S140, step S164 follows and the processes (the reverse side is set to the document sheet side and the mid-procedure is executed) in steps S138 and S139 are executed. Step S160 follows.

A process (to discriminate whether there is a next page or not) similar to that in step S140 mentioned above is executed in step S166. If NO (there is not the next page), step S168 follows and the same process (post-procedure) as that in step S142 is executed. Step S4 follows. If YES (there is the next page), step S170 follows and the same processes (the mid-procedure is executed and the count value of the transmission page counter is increased by "1") as those in steps S144 and S146 are executed. The front side is set to the document sheet side in step S172 and step S160 follows.

Explanation has been made on the assumption that the operation of the control circuit as mentioned above is executed by the CPU in the control circuit on the basis of programs stored in an ROM, an RAM, or the like in the control circuit. However, according to the invention, the apparatus can be also constructed in a manner such that those programs are stored into an external memory medium such as floppy disk, hard disk, optical disk, CD-ROM, memory card, or the like, installed into the control circuit by a dedicated reading apparatus, and executed by the CPU in the control circuit.

Although the above embodiment has been described as an example of the facsimile apparatus of the stand-alone type, the invention is not limited to it but can be applied to a data communication control in an integrated data processing system in which, for example, a copying function and an electronic filing function and, further, a data processing function are combined to a communicating function.

According to the embodiment of the invention as described above, in the case where a communication error occurs on the reverse side during the transmission of the both-side document sheet and a re-transmission is executed after that, the transmitter side re-transmits the data from the front side. Therefore, the front side does not become a blank paper. On the receiver side, when the error re-transmitted reception document sheet is combined to the document sheet first received, the document sheet whose front side is the blank paper is not inserted in the middle of the both-side document sheet and the reception document sheet which can be easily seen can be obtained.

According to the embodiment, if the re-transmission of the data of the document sheet of the first page and the data from the error page is selected as an error re-transmission, the transmission of only the front side of the first page and the transmission from the font side of the error document sheet can be performed in the transmission of the both-side document sheet. The increase in communication costs due to the transmission of the unnecessary read data of the reverse side of the document sheet of the first page to the user on the receiver side does not occur. The reception document sheet of the error re-transmission and the document sheet received before it can be coupled without changing the order of the front side and the reverse side and an apparatus which can be easily operated for the user can be provided.

Embodiment 2

In the embodiment 2, only the portions different from those in the embodiment 1will be described. The same portions as those in the diagrams in the embodiment 1are designated by the same reference numerals and their descriptions are omitted.

An outline of the both-side transmission of the embodiment 2 will now be described.

As a communication mode of the both-side transmission, there are two modes of an alternate mode and a continuous mode.

The alternate mode is a mode to transmit the front sides and reverse sides of the both-side document sheet in accordance with the order of pages. The continuous mode is a mode to first transmit all of the front sides of the both-side document sheet in accordance with the order of pages and subsequently transmit all of the reverse sides of the both-side document sheet in accordance with the order of pages.

The definition of the both-side transmission in the FIF of the DIS, DTC, and DCS signals will now be described.

Figures 10, 11:
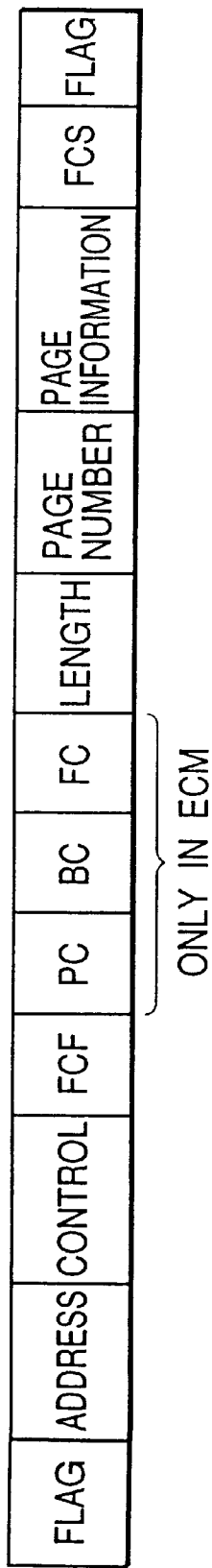
FIG. 10 is a diagram showing bits which are allocated to DIS, DTC, and DCS for both-side transmission.
FIG. 11 is a diagram showing Q and PPS-Q which are used for both-side transmission.

FIG. 10 shows the FIF of the DIS, DTC, and DCS signals regarding the both-side transmission. In the DIS/DTC signals, the presence or absence of the both-side recording function in the alternate mode is shown by the X-th bit of the FIF, and the presence or absence of the both-side recording function in the continuous mode is shown by the (X+1)th bit of the FIF. In the DCS signal, the both-side transmission in the alternate mode is shown by the X-th bit of the FIF and the both-side transmission in the continuous mode is shown by the (X+1)th bit of the FIF. When the (X+1)th bit is set to "1" by the DIS/DTC, the X-th bit has to be set to "1".

FIG. 11 shows a frame construction of a Q signal (EOP, MPS, EOM) in the normal G3 transmission and a PPS-Q signal (PPS-EOP, PPS-MPS, PPS-EOM, PPS-NULL) in the ECM transmission.

FIG. 11 shows a frame comprising: Flag; Address; Control; FCF; PC (page counter); BC (block counter); FC (frame counter); Length (the total number of octets of the Page Number (2 octets) and the Page Information (1octet at present); Page number (value obtained by adding the number of pages of every front side page and reverse side page from the first page considering a case of alternately transmitting the front sides and the reverse sides of the both-side document sheet in accordance with the order of pages); Page information (the front side (set to "0") or the reverse side (set to "1") is designated by bit 0); FCS; and Flag.

None of PC, BC, and FC is included in the Q signal which is used in a normal G3 mode, and PC, BC, and FC are used in only a PPS-Q signal which is used in the ECM communication.

Figure 12:
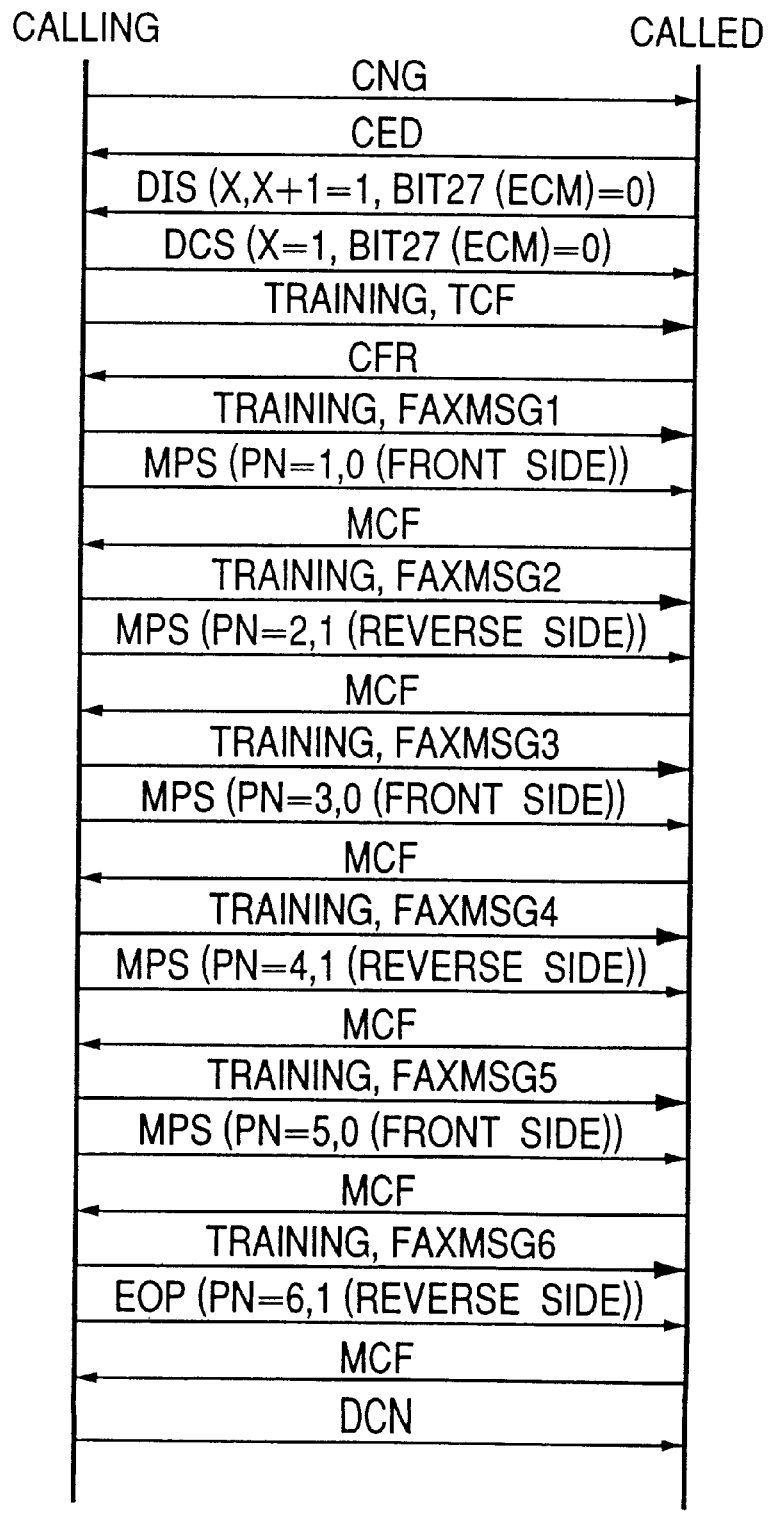
FIG. 12 is a diagram showing a both-side transmission in an alternate mode in a normal G3 mode.

FIG. 12 shows the both-side transmission in the alternate mode in the normal G3 mode.

Figure 13:
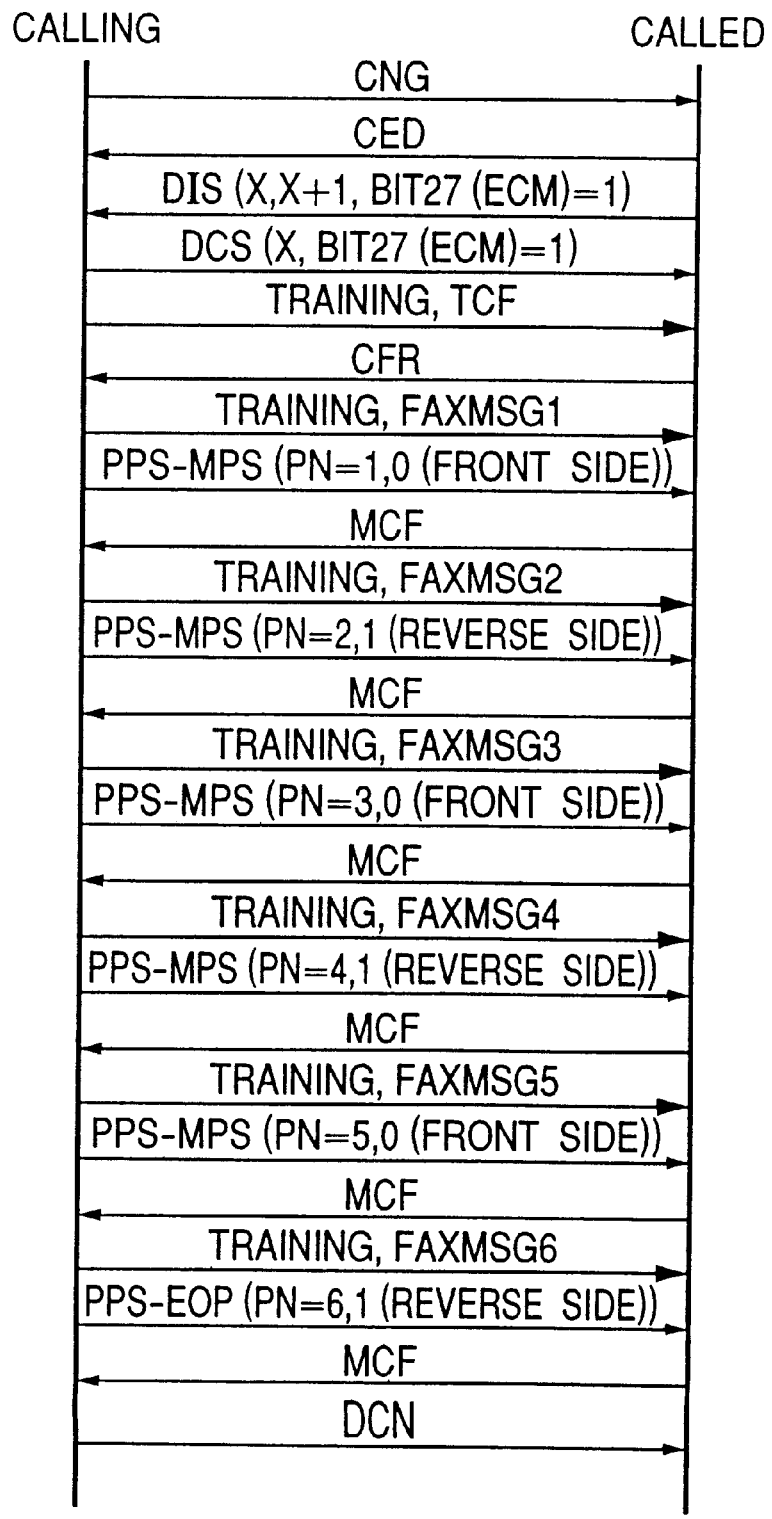
FIG. 13 is a diagram showing a both-side transmission in an alternate mode in an ECM mode.

FIG. 13 shows the both-side transmission in the alternate mode in the ECM mode.

Figure 14:
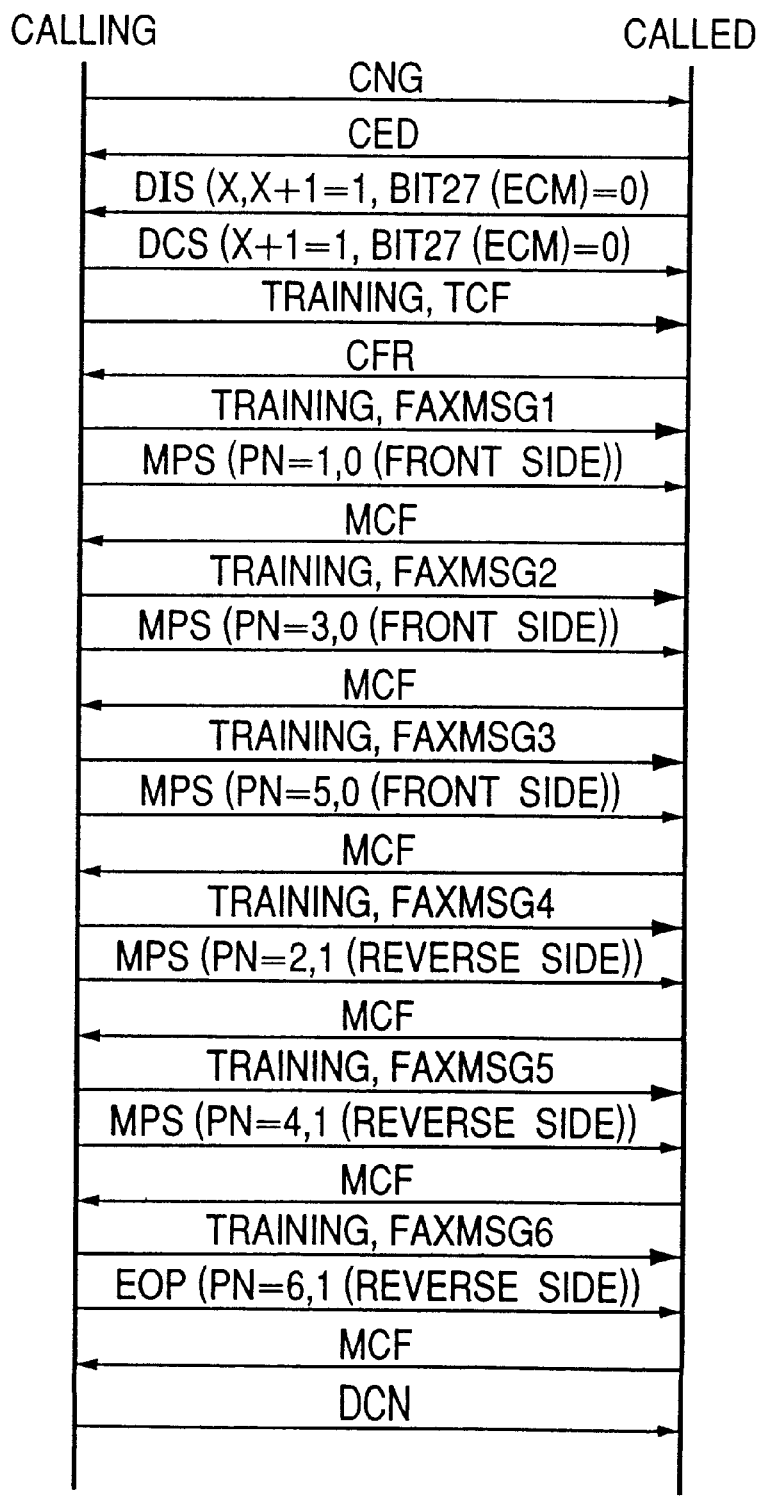
FIG. 14 is a diagram showing a both-side transmission in a continuous mode in the normal G3 mode.

FIG. 14 shows the both-side transmission in the continuous mode in the normal G3 mode.

Figure 15:
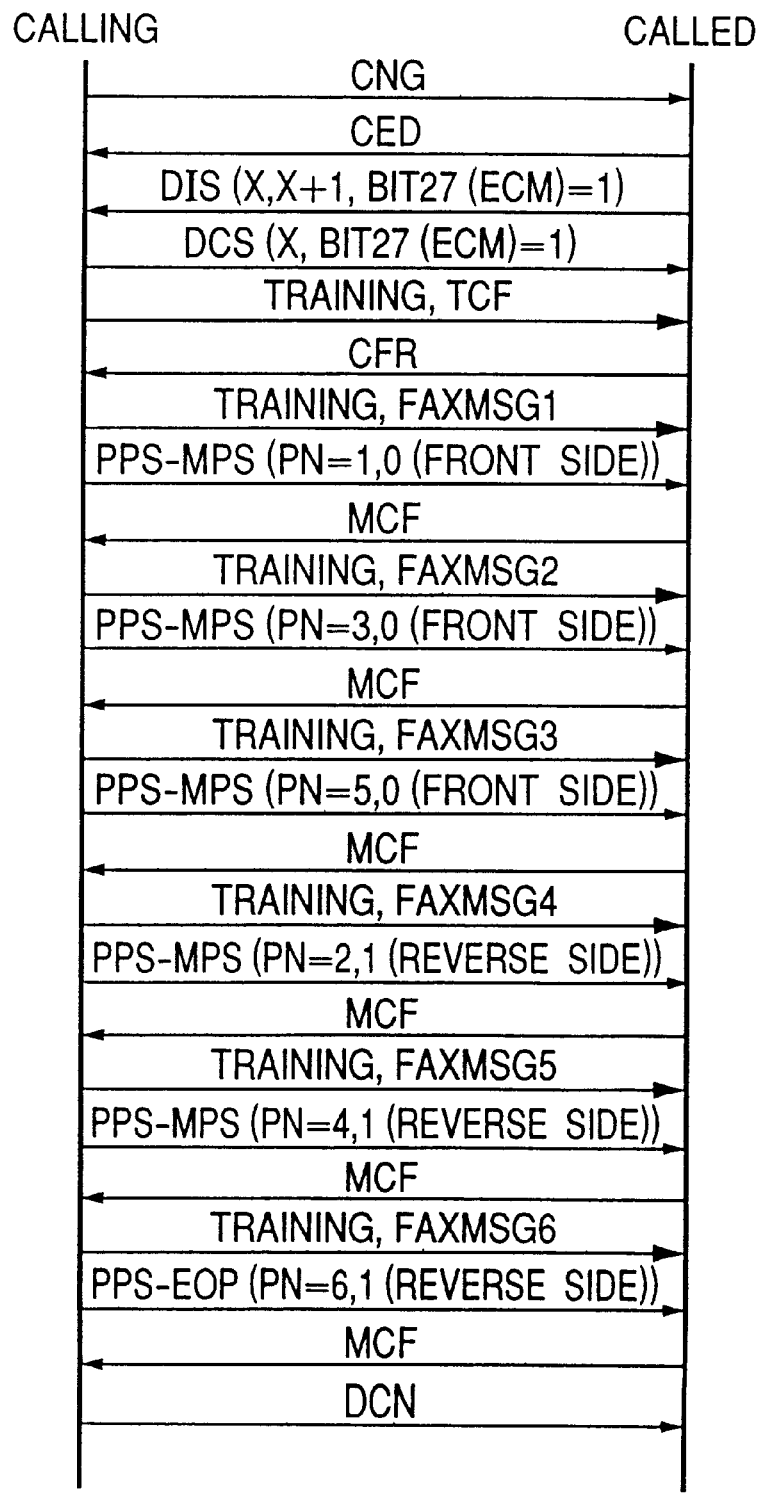
FIG. 15 is a diagram showing a both-side transmission in the continuous mode in the ECM mode.
Figure 16:
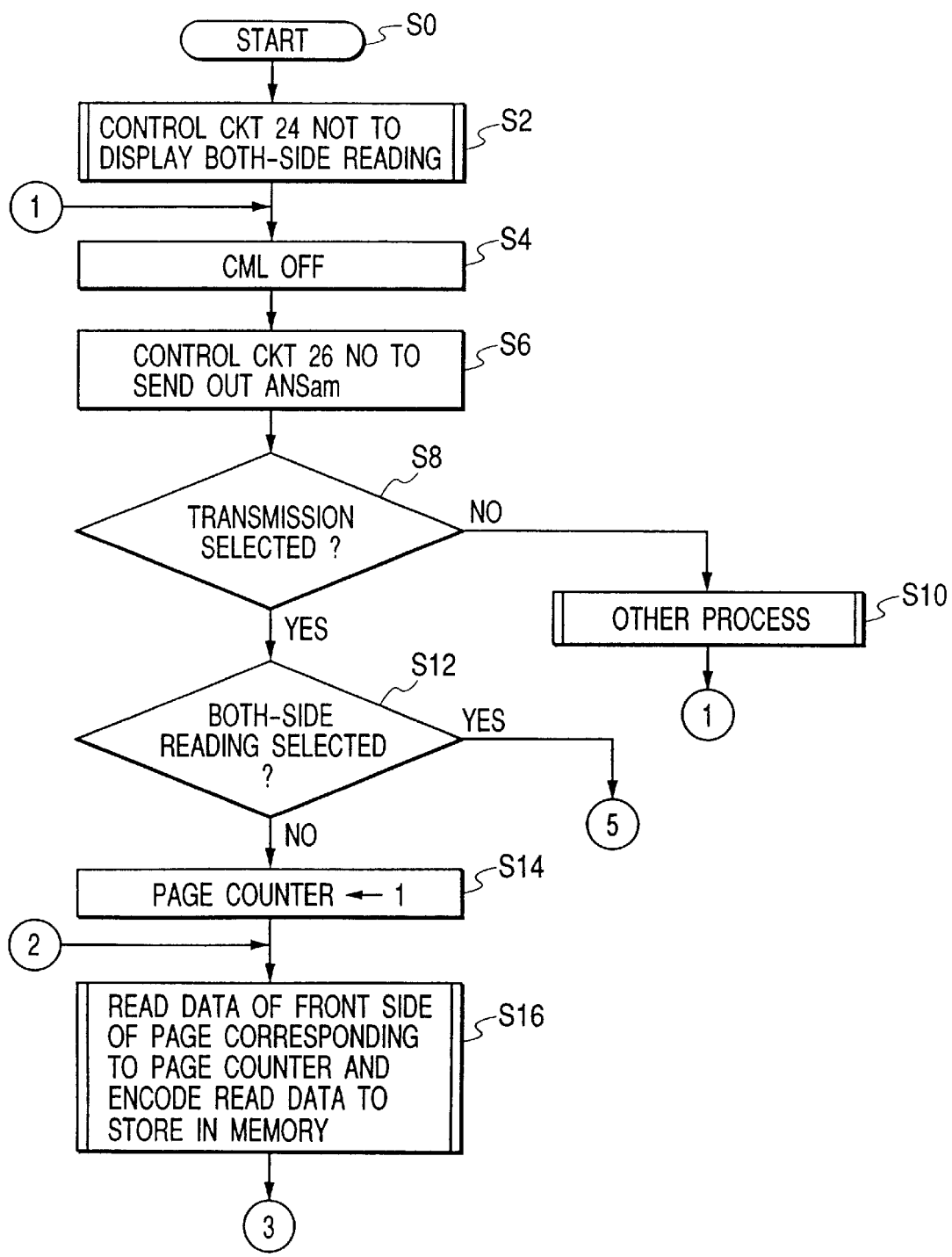
FIG. 16 is a flowchart of an embodiment 2.

FIG. 15 shows the both-side transmission in the continuous mode in the ECM mode.

FIGS. 16 to 23 show the processing operation of the control circuit 20 in the embodiment 2.

In the diagrams, the same processes as those in the embodiment 1are designated by the same reference numerals and their descriptions are omitted.

In the embodiment 2, mainly, in a facsimile apparatus which can perform the alternate both-side transmission according to the ITU-T recommendation, it is assumed that when a communication error occurs during the transmission of the both-side document sheet, even if an error occurred in an even-number page, the page number to be re-transmitted is set to an odd-number page and data is re-transmitted from this odd page.

Specifically speaking, even if an error occurred during the transmission of the page of page No. 2(n+1) (reverse side), data is re-transmitted from the page of page No. 2n+1(front side) that is one-preceding thereto.

The apparatus further has means for selecting whether the front side of the document sheet of the first page is transmitted or not as an error re-transmission. If the re-transmission of the front side of the document sheet of the first page is selected, the front side of the document sheet of the first page is transmitted upon re-transmission after the occurrence of the error. Subsequently, entirely blank data is transmitted as data of the reverse side and data is re-transmitted from the front side of the document sheet in which the error occurred.

The page number (page number which is notified to the receiver) which is added to the same page when the document sheet of the first page is re-transmitted upon re-transmission and that when it is not re-transmitted are different.

In the embodiment 1, the number of document sheets is counted by the page counter and stored into the memory as a front side and a reverse side of each page. In the embodiment 2, besides it, a control to add different page numbers (serial numbers) to the front side and reverse side of each document sheet and notify the reception side of the different page numbers is performed.

Figure 17:
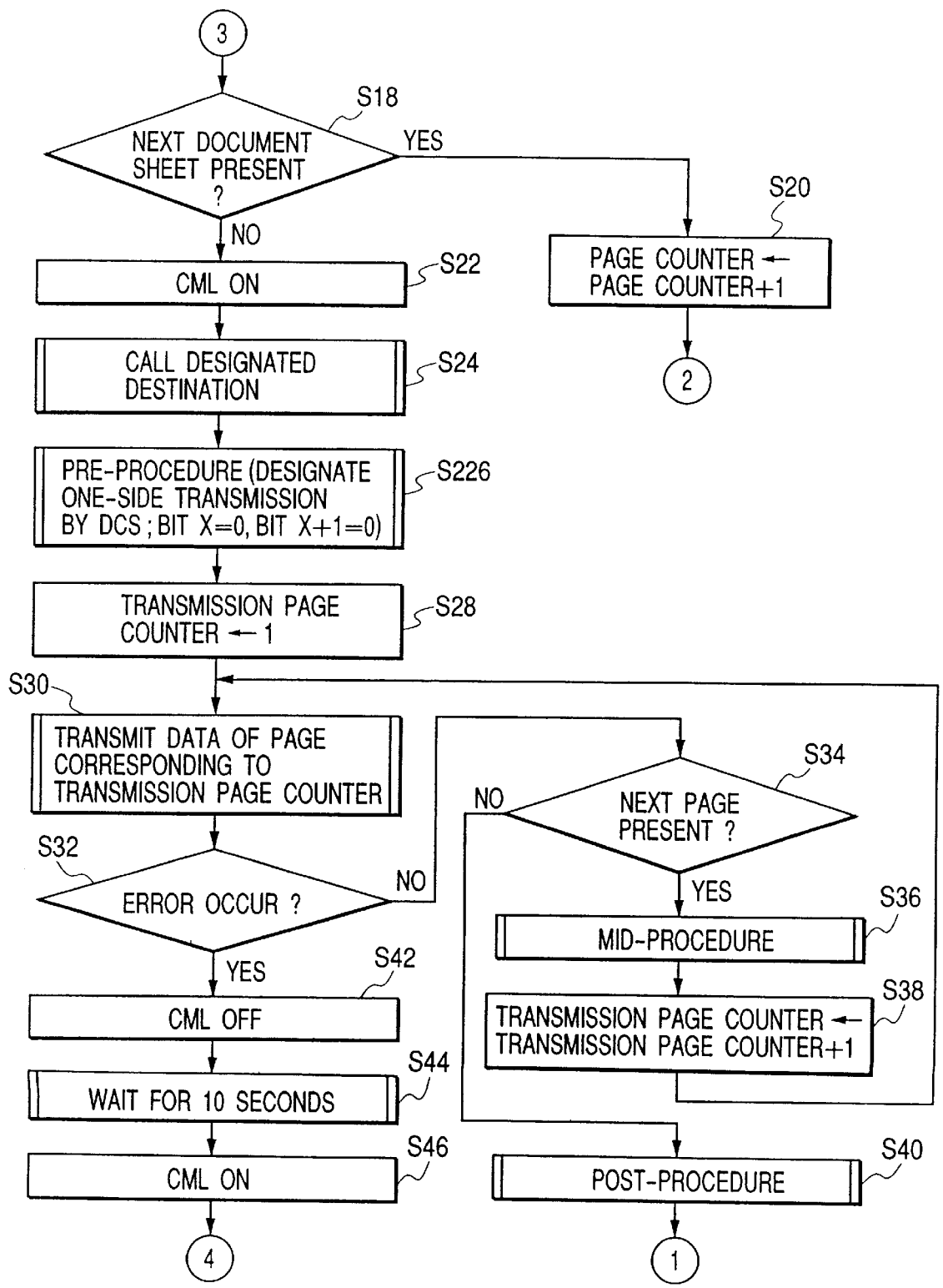
FIG. 17 is a flowchart of the embodiment 2.

In FIG. 17, a pre-procedure is performed and the one-side transmission is designated by the DCS signal in step S226. Specifically speaking, the X-th bit and the (X+1)th bit of the FIF of the DCS signal are set to "0".

Figure 18:
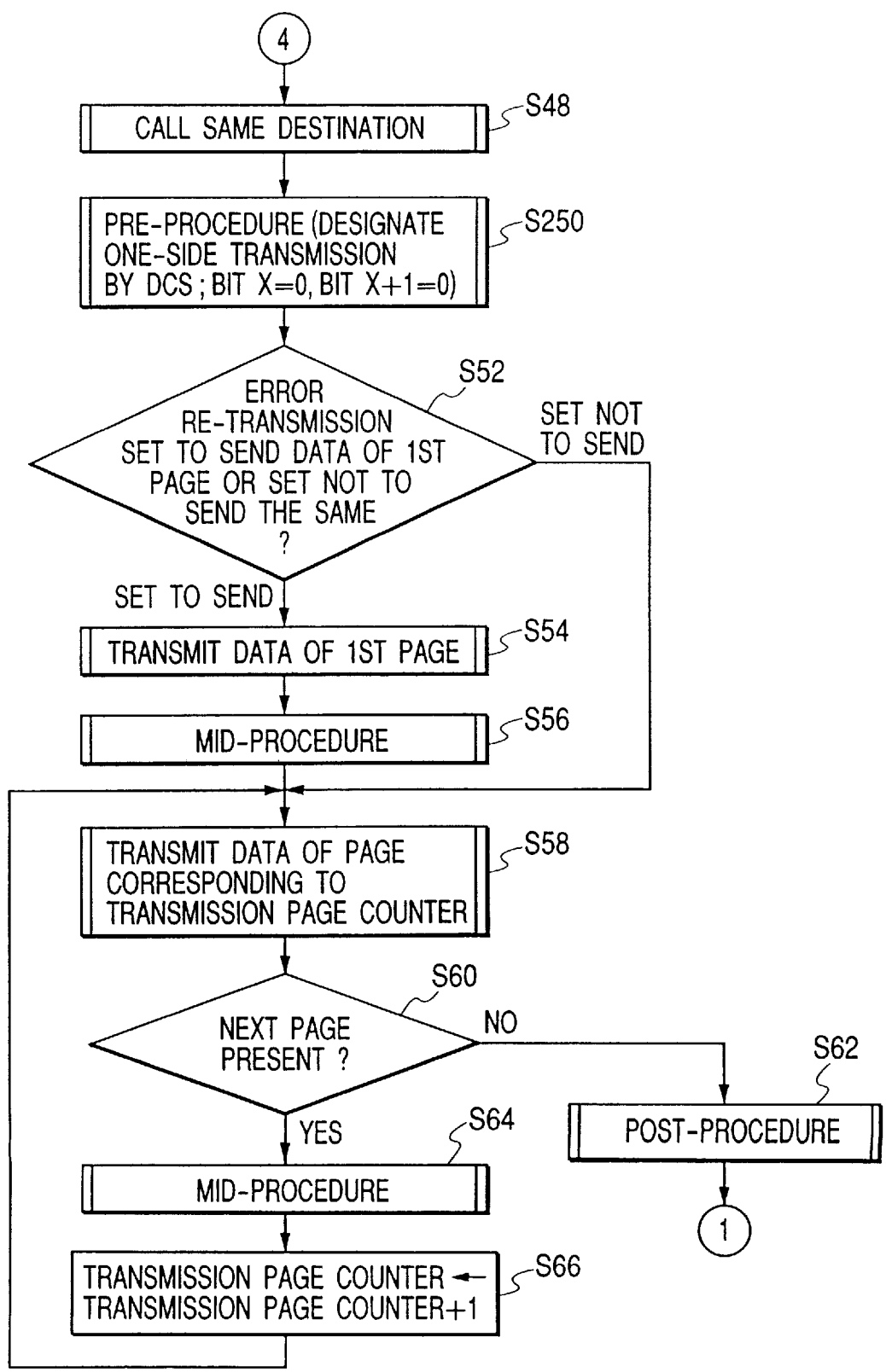
FIG. 18 is a flowchart of the embodiment 2.

In FIG. 18, a pre-procedure is performed and the one-side transmission is designated by the DCS signal in step S250. Specifically speaking, the X-th bit and the (X+i)th bit of the FIF of the DCS signal are set to "0".

Figure 19:
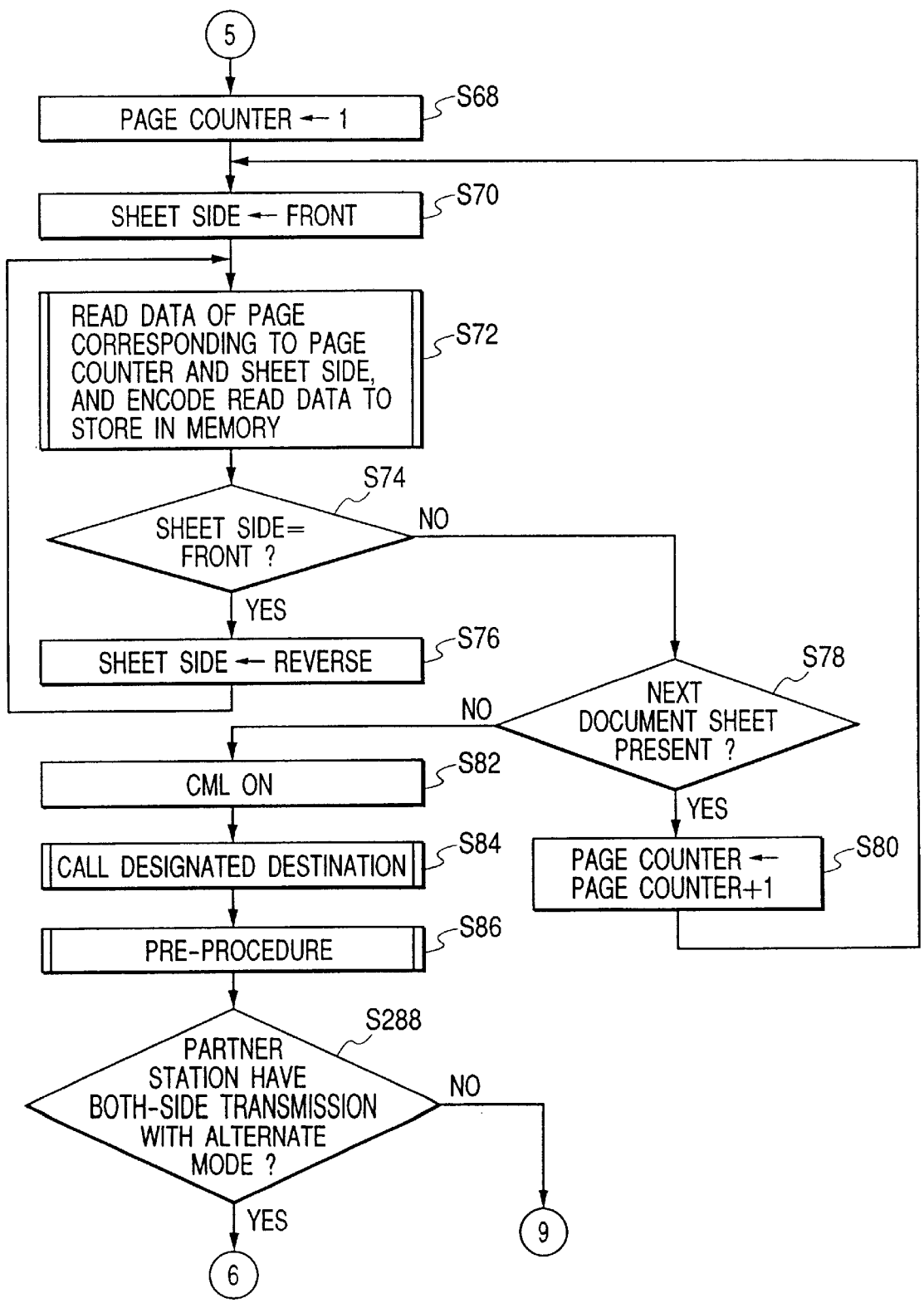
FIG. 19 is a flowchart of the embodiment 2.

Whether the partner station has the both-side transmission function in the alternate mode or not is discriminated in step S288 in FIG. 19. If YES, step S290 in FIG. 20 follows. If NO, step S2148 in FIG. 23 follows.

Figure 20:
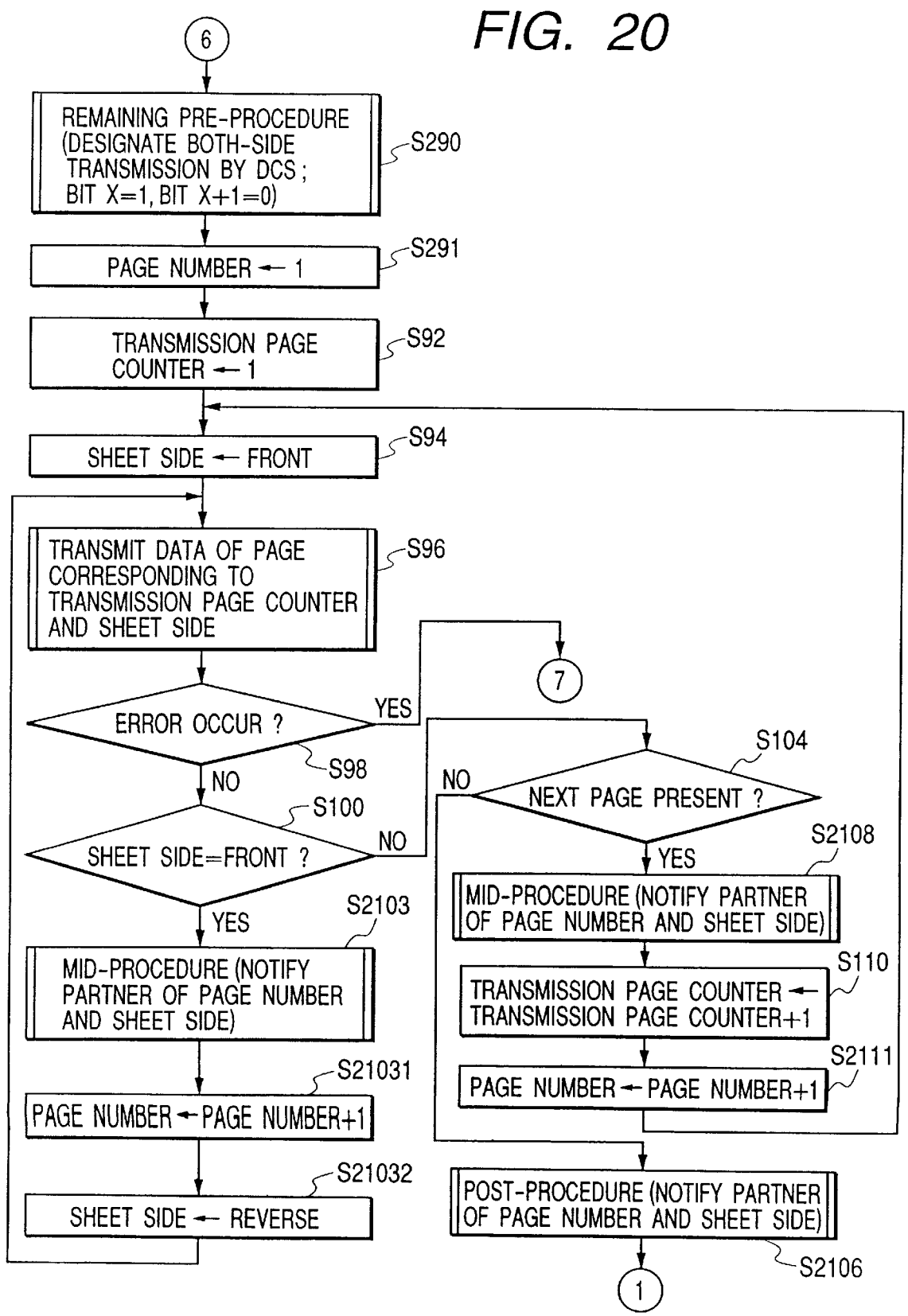
FIG. 20 is a flowchart of the embodiment 2.

A remaining pre-procedure is executed and the both-side transmission is designated by the DCS signal in step S290 in FIG. 20. Specifically speaking, the X-th bit of the FIF of the DCS signal is set to "1" and the (X+1)th bit is set to "0". Subsequently, in step S291, "1" is set into the page number.

Figure 3:
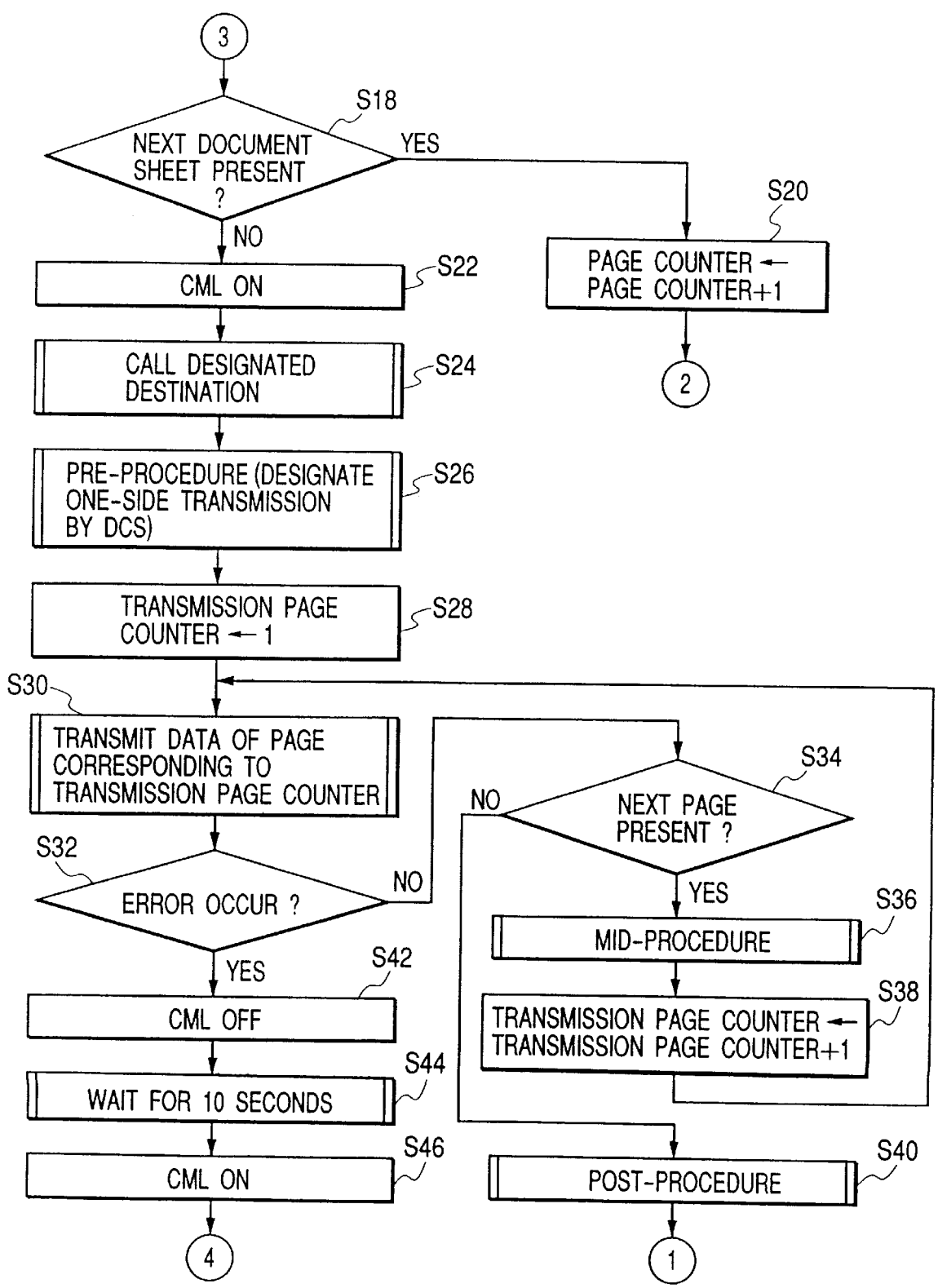
FIG. 3 is a flowchart showing the operation in the embodiment.
Figure 4:
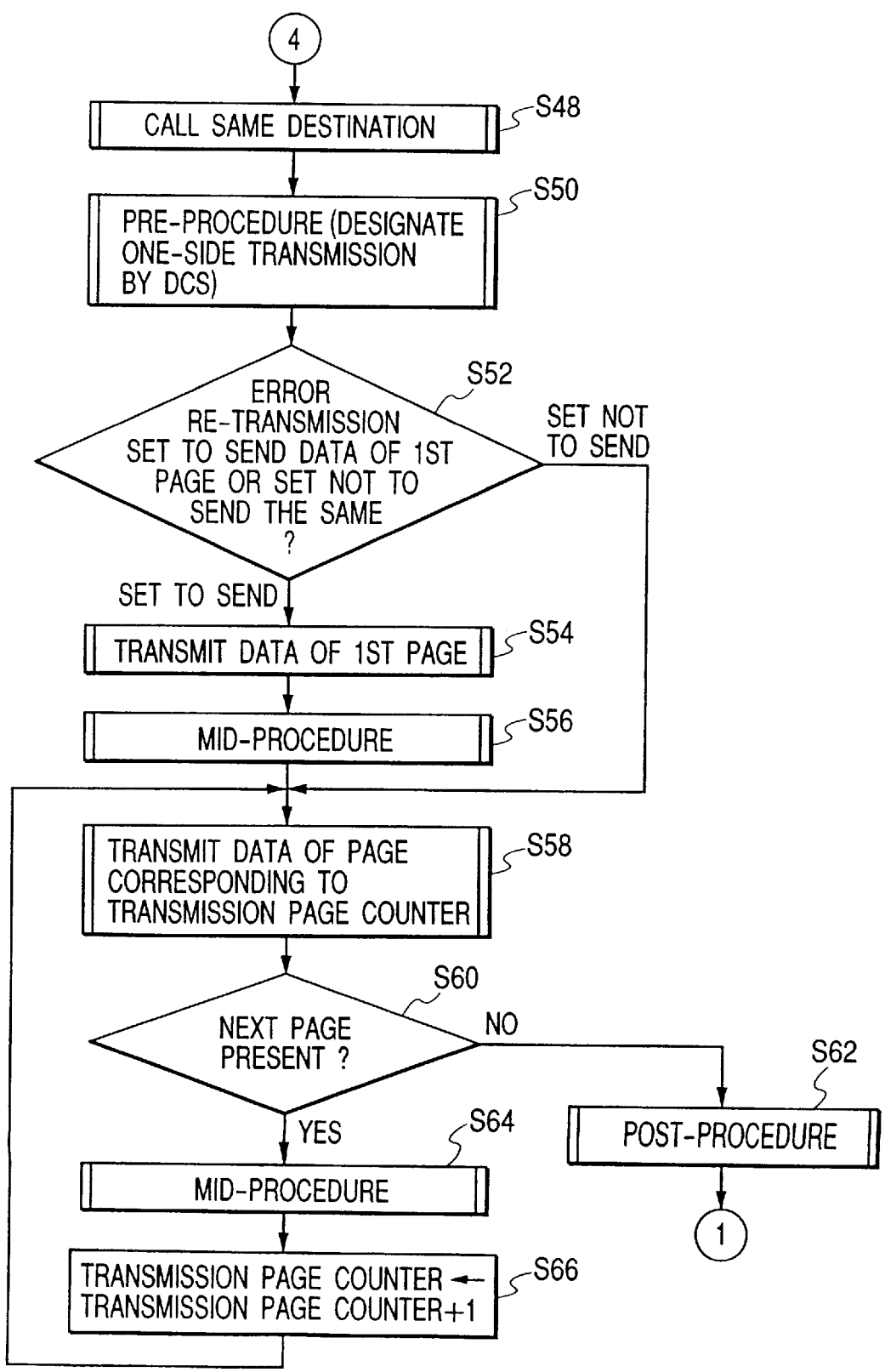
FIG. 4 is a flowchart showing the operation in the embodiment.
Figure 5:
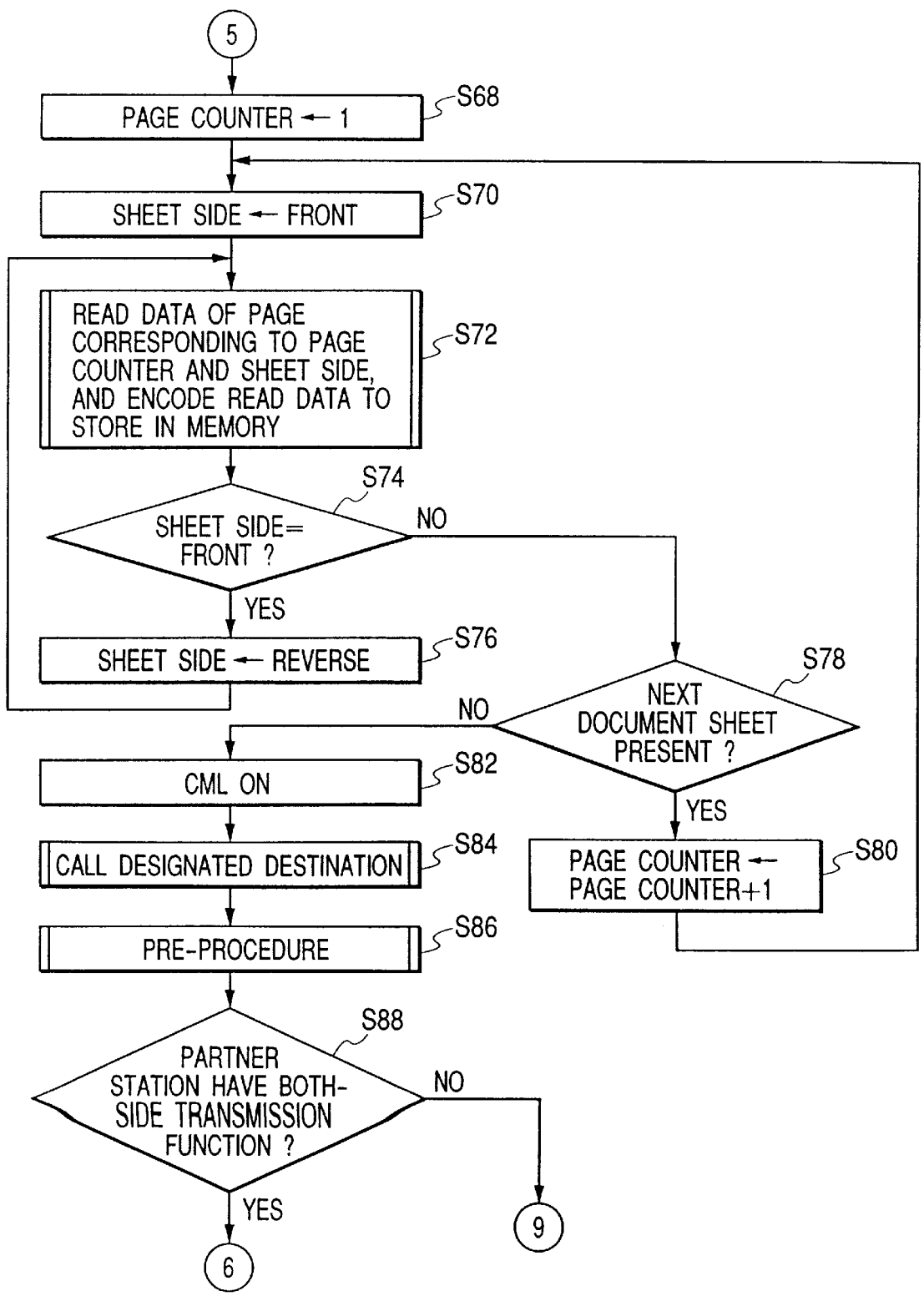
FIG. 5 is a flowchart showing the operation in the embodiment.
Figure 6:
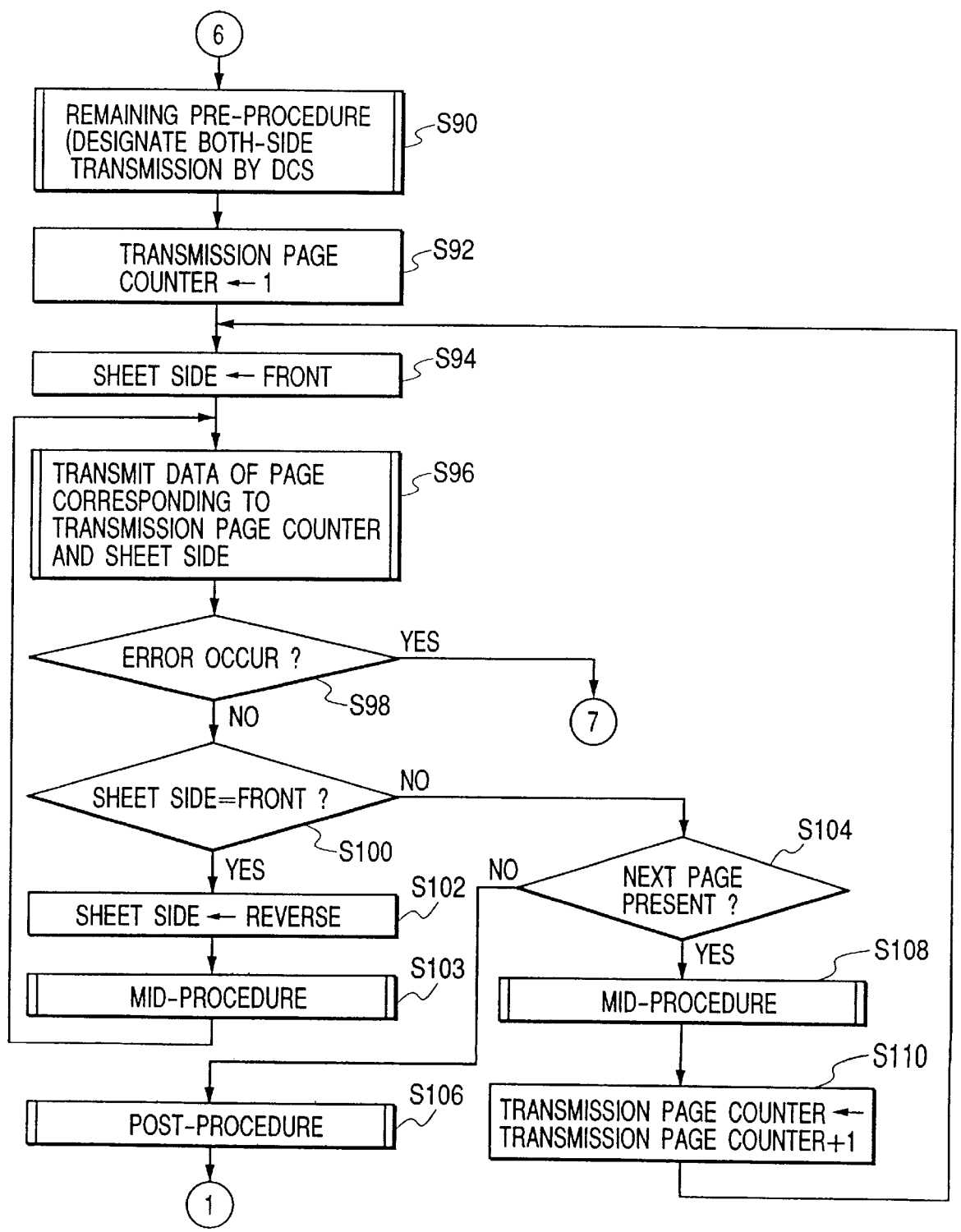
FIG. 6 is a flowchart showing the operation in the embodiment.
Figure 7:
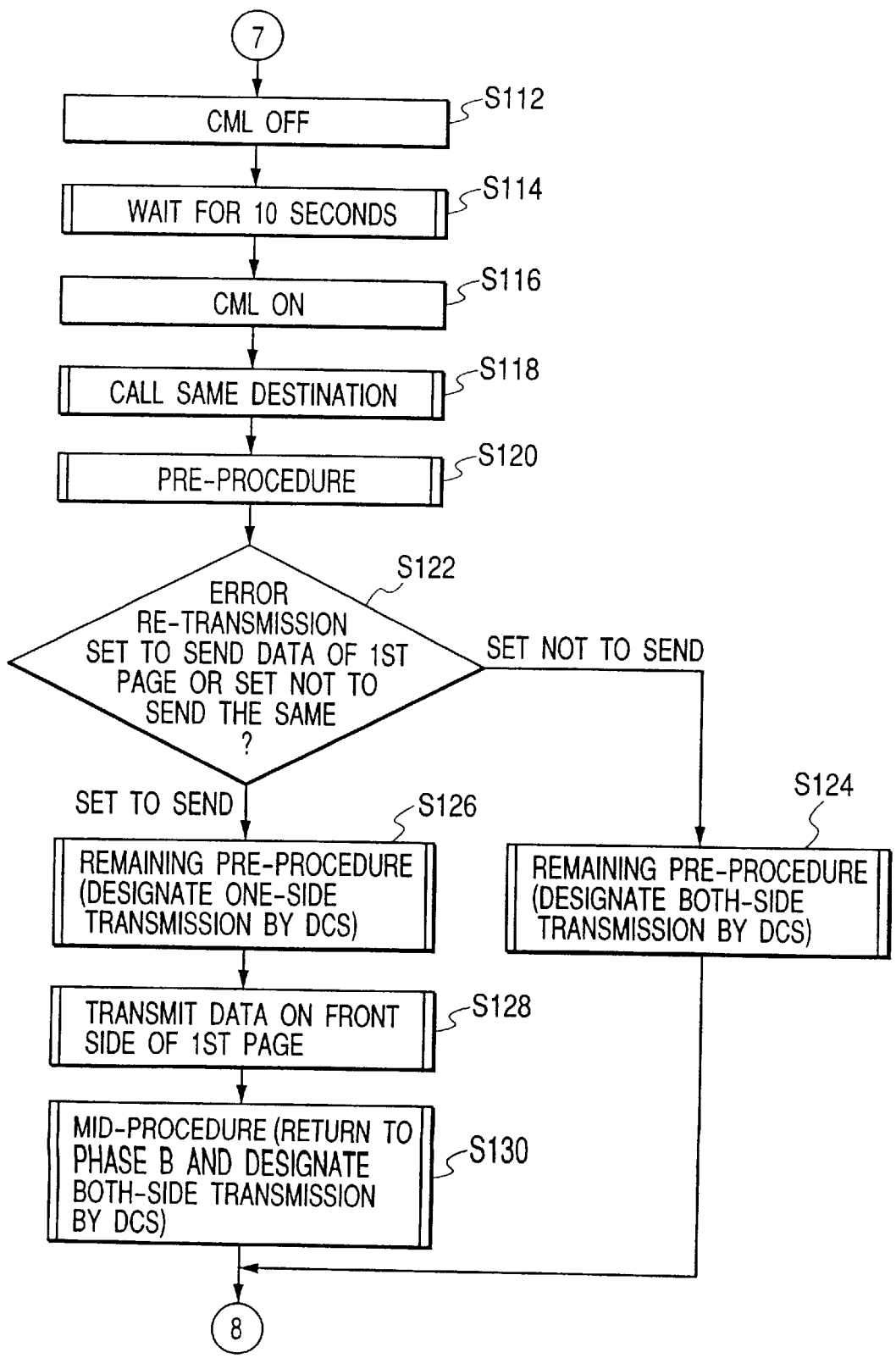
FIG. 7 is a flowchart showing the operation in the embodiment.
Figure 8:
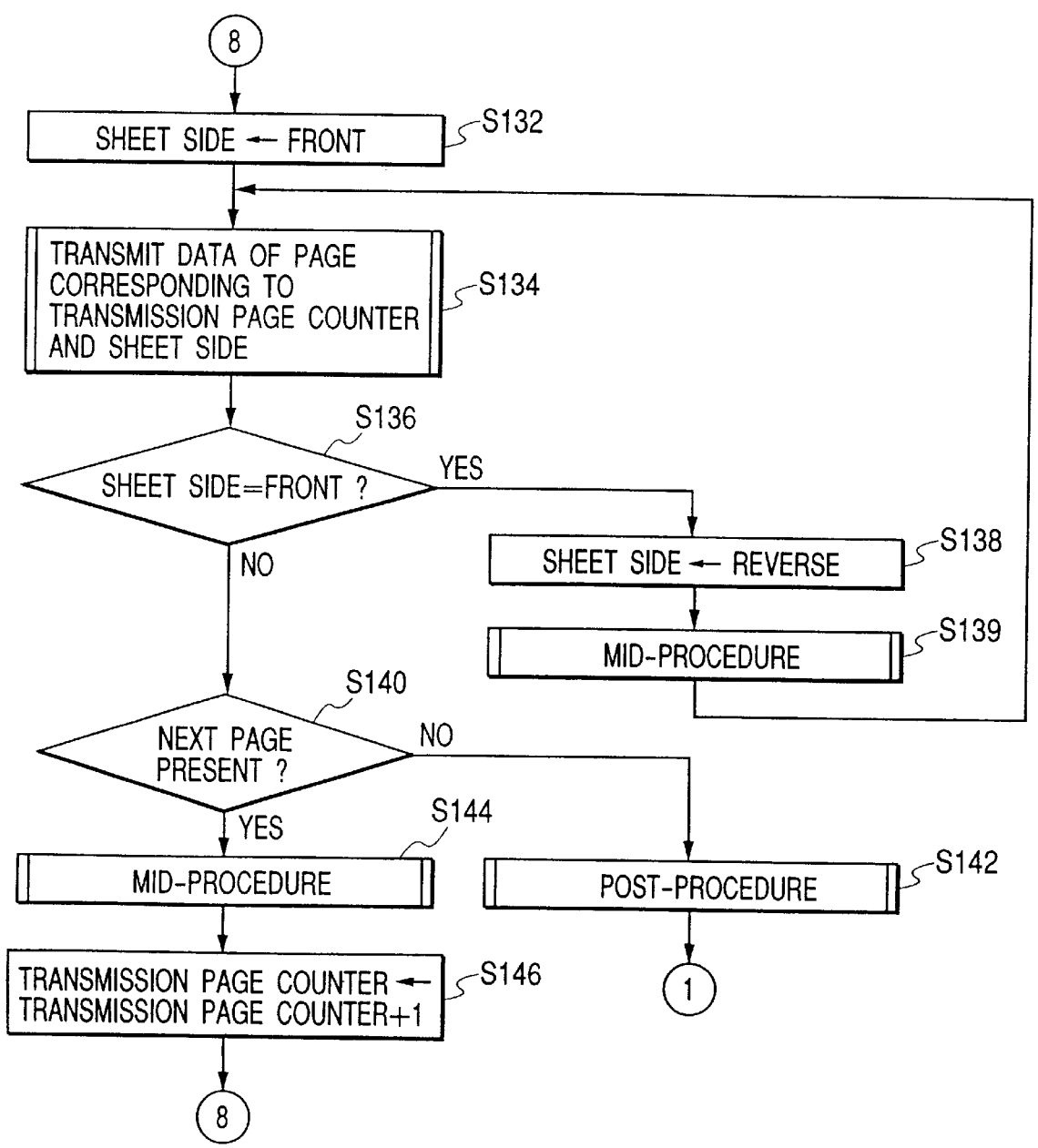
FIG. 8 is a flowchart showing the operation in the embodiment.
Figure 9:
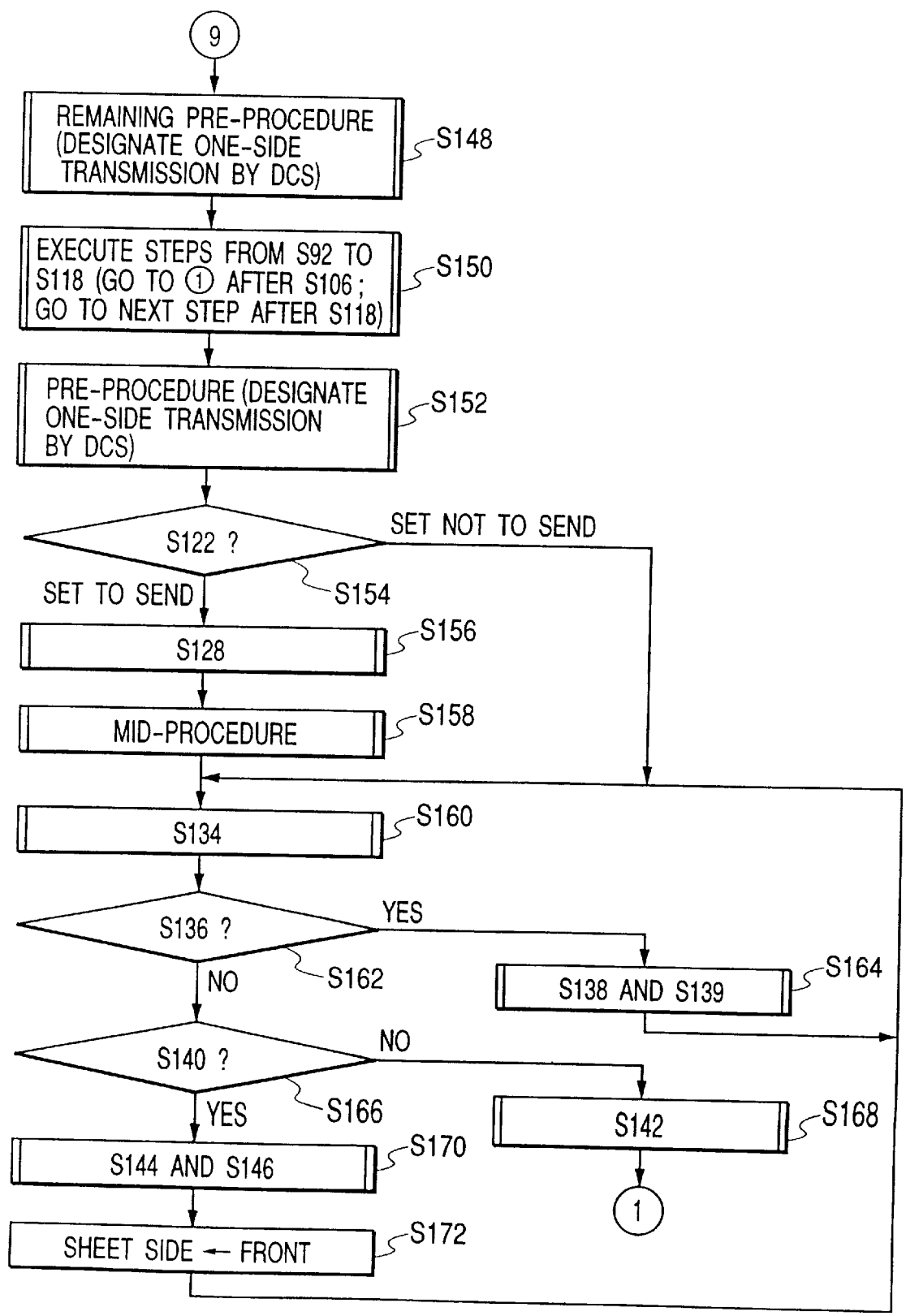
FIG. 9 is a flowchart showing the operation in the embodiment.

A mid-procedure is executed and the page number and the document sheet side are notified to the receiver by using the Q and PPS-Q described in FIG. 3 in step S2103. The page number is increased by "1" in step S21031. The reverse side is set to the document sheet side in step S21032.

A mid-procedure is executed and the page number and the document sheet side are notified to the receiver by using the Q and PPS-Q described in FIG. 3 in step S2108.

A post-procedure is executed and the page number and the document sheet side are notified to the receiver by using the Q and PPS-Q described in FIG. 3 in step S2106.

Figure 21B:
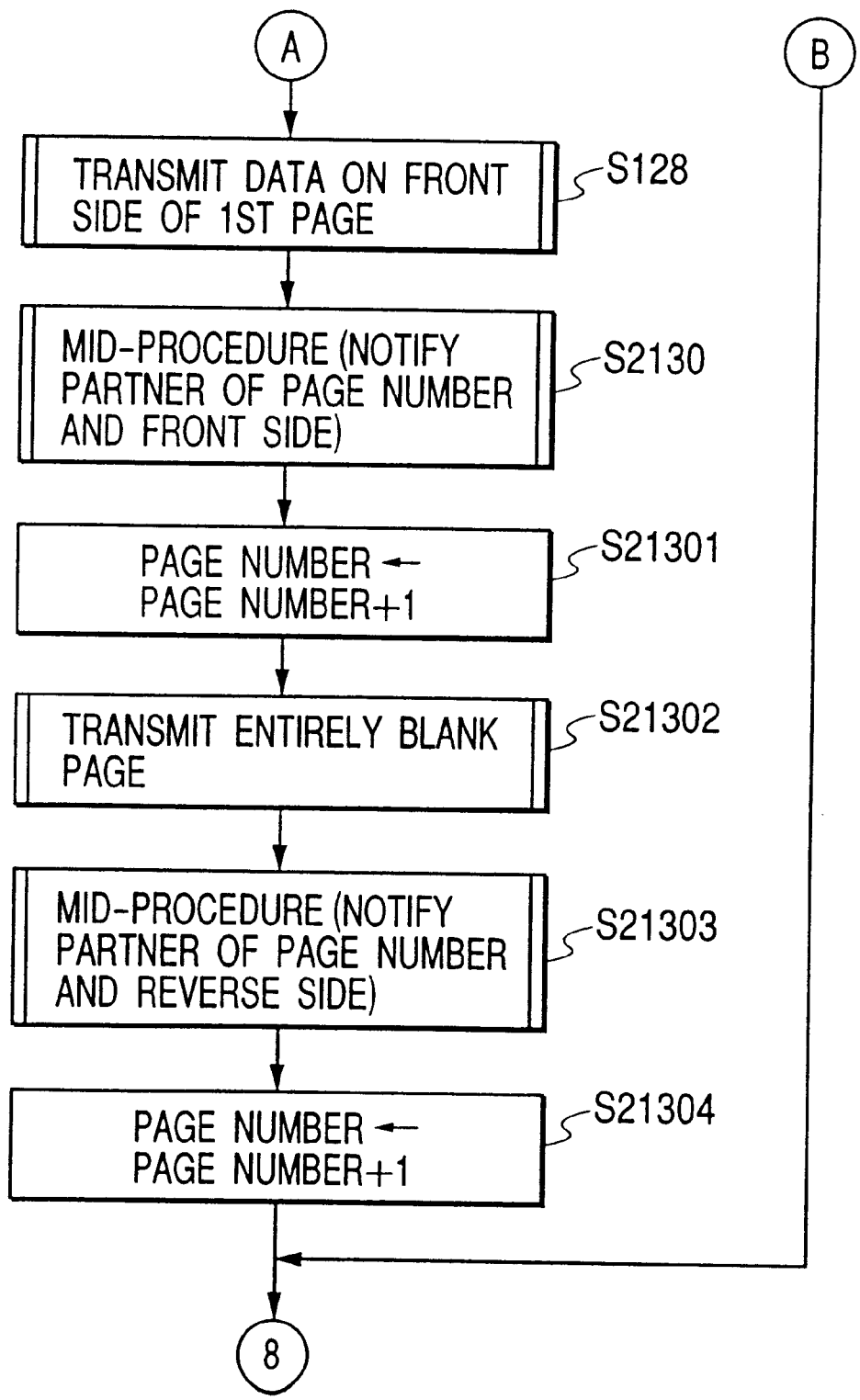
FIG. 21 is comprised of FIGS. 21A and 21B showing flowcharts of the embodiment 2.

"1" is set into the page number in step S2121 in FIGS. 21A and 21B.

The both-side transmission is designated in steps S2126 and S2124. Specifically speaking, the X-th bit of the FIF of the DCS signal is set to "1" and the (X+1)th bit is set to "0".

A mid-procedure is executed, the page number is notified and the front side is notified to the receiver as a document sheet side by using the Q and PPS-Q described in FIG. 3 in step S2130. The page number is increased by "1" in step S21301. The data of the entirely blank page is transmitted in step S21302. If only the front side of the first page is re-transmitted, the user on the reception side can sufficiently recognize the error re-transmission is a re-transmission of which communication. Therefore, the data of the entirely blank page is transmitted in place of transmitting the data of the reverse side of the first page. A mid-procedure is executed, the page number is notified, and the reverse side is notified to the receiver as a document sheet side by using the Q or PPS-Q described in FIG. 3 in step S21303. The page number is increased by "1" in step S21304.

Figure 22:
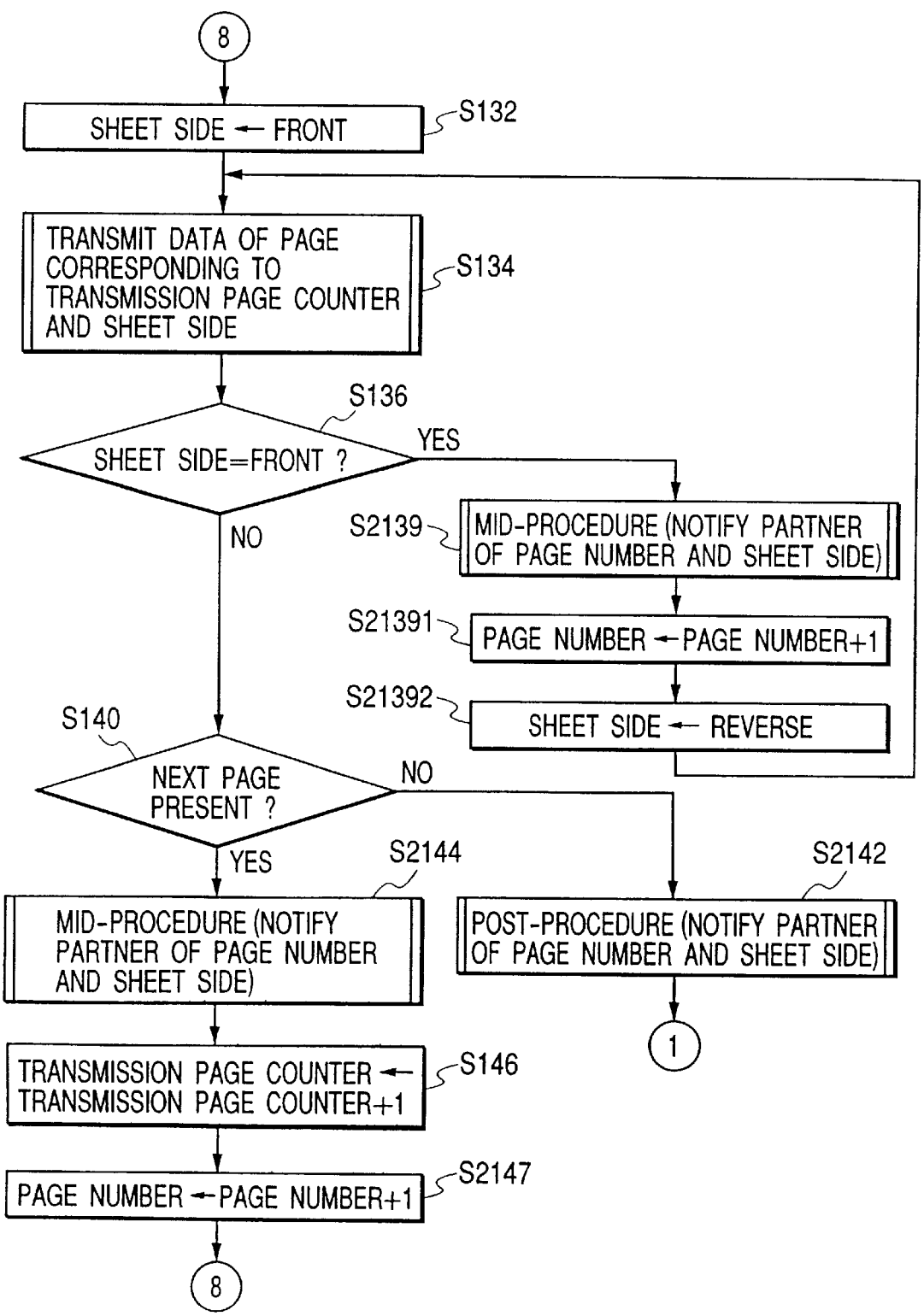
FIG. 22 is a flowchart of the embodiment 2.

A mid-procedure is executed and the page number and the document sheet side are notified to the receiver by using the Q or PPS-Q described in FIG. 3 in steps S2139 and S2144 in FIG. 22.

A post-procedure is executed and the page number and the document sheet side are notified to the receiver by using the Q or PPS-Q described in FIG. 3 in step S2142.

The page number is increased by "1" in steps S2147 and S21391.

The reverse side is set to the document sheet side in step S21392.

Figure 23:
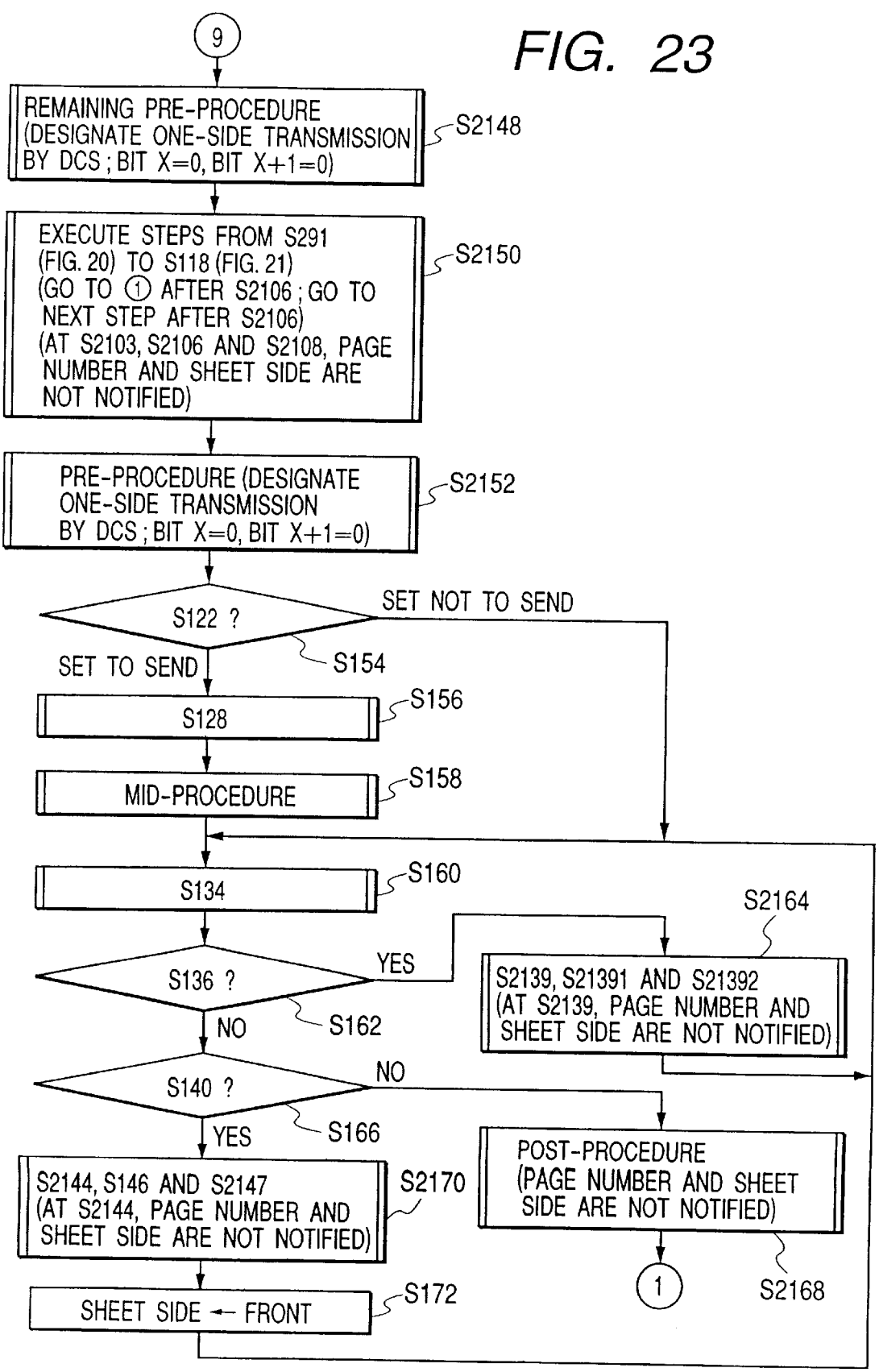
FIG. 23 is a flowchart of the embodiment 2.

In FIG. 23, a remaining pre-procedure is executed and the one-side transmission is designated by the DCS signal. Specifically speaking, the X-th bit and the (X+1)th bit of the DCS signal are set to "0".

A control similar to that in a range from step S291 in FIG. 20 to step S118 in FIG. 21A is executed in step S2150. The page number and the document sheet side are not notified in the mid-procedure in steps S2103 and S2108 and the post-procedure in step S2106.

A pre-procedure is executed in step S2152 and the one-side transmission is designated by the DCS signal. Specifically speaking, the X-th bit and the (X+1)th bit of the DCS signal are set to "0".

The same processes as those in steps S2139, S21391, and S21392 are executed in step S2164 (after the mid-procedure, the page number is increased by "1" and the reverse side is set to the document sheet side). The page number and the document sheet side are not notified in step S2139.

A post-procedure is executed in step S2168. The page number and the document sheet side are not notified.

The same processes as those in steps S2144, S146, and S2147 are executed in step S2170 (the mid-procedure is executed, the count value of the transmission page counter is increased by "1", and the page number is increased by "1"). The page number and the document sheet side are not notified in step S2144.

What is claimed is:

1. A facsimile apparatus which can perform a both-side reading, a both-side transmission, and a both-side recording of document sheet data, comprising:
   means for notifying a transmitter of the presence or absence of a both-side reception function from a receiver and designating a both-side document sheet by a DCS signal from said transmitter to said receiver; and
   transmitting means for,
   (1) when designating the both-side document sheet by the DCS signal, sequentially transmitting front sides and reverse sides, and returning to phase B to designate a one-side document sheet by the DCS signal when shifting to the one-side document sheet in the middle of a page,
   (2) when designating the one-side document sheet by the DCS signal, transmitting it, and returning to said phase B to designate the both-side document sheet by the DCS signal and thereafter sequentially transmitting the front sides and reverse sides when shifting to the both-side document sheet in the middle of the page; and
   (3) always re-transmitting from the front side at the same time of the transmission of the both-side document sheet as an error re-transmission when an error occurs during a communication.

2. An apparatus according to claim 1, wherein in an error during the transmission of the front side of the document sheet of an n-th page or an error during the transmission of the reverse side of the document sheet of the n-th page in said error re-transmission, said transmitting means executes the re-transmission from the front side of the document sheet of the n-th page.

3. An apparatus according to claim 1 or 2, further comprising selecting means for selecting either a first mode to perform the re-transmission of data of the document sheet of a first page and data from a page in which an error occurred or a second mode to perform the re-transmission from the page in which the error occurred when said error re-transmission is set, and wherein when said second mode is selected, said transmitting means executes a control of said error re-transmission as it is, and when said first mode is selected, said transmitting means first designates the one-side document sheet by the DCS signal, executes the transmission of the front side of the document sheet of the first page, subsequently, returns to said phase B, designates the both-side document sheet by the DCS signal, and thereafter, executes the control of said error re-transmission.

4. A facsimile apparatus which can perform a both-side reading and a both-side transmission of document sheet data, comprising:

notifying means for notifying a transmitter of the presence or absence of a both-side reception function from a receiver and designating a both-side document sheet from said transmitter to said receiver; and means for calling the same destination, designating the both-side document sheet by said notifying means, and re-transmitting from a front side of a document sheet in which an error occurred in a reverse side in case of performing an error re-transmission when the error occurs during a communication in which the both-side document sheet has been designated by said notifying means and the communication is finished as an error.

5. A communicating apparatus which can perform a both-side reading and a both-side transmission of document sheet data, comprising:

designating means for designating a both-side document sheet and a one-side document sheet from a transmitter to a receiver; and transmitting means for re-designating the both-side document sheet or the one-side document sheet by a DCS signal by returning to phase B and transmitting a subsequent document sheet in case of shifting to the transmission of the one-side document sheet during the transmission in which the both-side document sheet is designated and in case of shifting to the transmission of the both-side document sheet during the transmission in which the one-side document sheet is designated.

6. A facsimile communicating method in a facsimile apparatus which can perform an alternate both-side transmission according to the ITU-T recommendation, wherein when a communication error occurs during transmission of a both-side document sheet, even if an error occurs in a reverse side, a re-transmission from a front side corresponding to the reverse side in which the error occurred is performed.

7. A method according to claim 6, wherein as for the re-transmission when the communication error occurs in a page of a page number 2(n+1) (n is a positive integer) which is notified by a procedure signal, the transmission is performed from a page of a page number 2n+1.

8. A method according to claim 6 or 7, wherein said apparatus has means for selecting whether the front side of a document sheet of a first page is transmitted or not as said error re-transmission, when the transmission of the front side of the document sheet of the first page is selected, the front side of the document sheet of the first page is re-transmitted, entirely blank data is subsequently transmitted as reverse side data, and thereafter, the re-transmission from the front side of the document sheet in which the error occurred is performed.

9. A method according to claim 8, wherein a page number which is added to a same page changes depending on whether the front side of the document sheet of the first page is transmitted or not in the error re-transmission.

10. A method for use with a facsimile apparatus which can perform a both-side reading, a both-side transmission, and a both-side recording of document sheet data, said method comprising the steps of:

notifying a transmitter of the presence or absence of a both-side reception function from a receiver and designating a both-side document sheet by a DCS signal from the transmitter to the receiver; and (1) when designating the both-side document sheet by the DCS signal, sequentially transmitting front sides and reverse sides, and returning to phase B to designate a one-side document sheet by the DCS signal when shifting to the one-side document sheet in the middle of a page, (2) when designating the one-side document sheet by the DCS signal, transmitting it, and returning to said phase B to designate the both-side document sheet by the DCS signal and thereafter sequentially transmitting the front sides and reverse sides when shifting to the both-side document sheet in the middle of the page, and (3) always re-transmitting from the front side at the same time of the transmission of the both-side document sheet as an error re-transmission when an error occurs during a communication.

11. A method according to claim 10, wherein in an error during the transmission of the front side of the document sheet of an n-th page or an error during the transmission of the reverse side of the document sheet of the n-th page in said error re-transmission, said-transmitting step includes the re-transmission from the front side of the document sheet of the n-th page.

12. A method according to claim 10 or 11, further comprising the step of selecting either a first mode to perform the re-transmission of data of the document sheet of a first page and data from a page in which an error occurred or a second mode to perform the re-transmission from the page in which the error occurred when said error re-transmission is set, and wherein when said second mode is selected, said transmitting step includes executing a control of said error re-transmission as it is, and when said first mode is selected, said transmitting step includes first designating the one-side document sheet by the DCS signal, executing the transmission of the front side of the document sheet of the first page, subsequently, returning to said phase B, designating the both-side document sheet by the DCS signal, and thereafter, executing the control of said error re-transmission.

13. A method for use with a facsimile apparatus which can perform a both side reading and a both-side transmission of document sheet data, said method comprising the step of:

notifying a transmitter of the presence or absence of a both-side reception function from a receiver and designating a both-side document sheet from the transmitter to the receiver; and calling the same destination, designating the both-side document sheet by said notifying means, and re-transmitting from a front said of a document sheet in which an error occurred in a reverse side in case of performing an error re-transmission when the error occurs during a communication in which the both-side document sheet has been designated in said notifying step and the communication is finished as an error.

14. A method for use with a communicating apparatus which can perform a both-side reading and a both-side transmission of document sheet data, said method comprising the steps of:

designating a both-side document sheet and a one-side document sheet from a transmitter to a receiver; and re-designating the both-side document sheet or the one-side document sheet by a DCS signal by returning to phase B and transmitting a subsequent document sheet in case of shifting to the transmission of the one-side document sheet during the transmission in which the both-side document sheet is designated and in case of shifting to the transmission of the both-side document sheet during the transmission in which the one-side document sheet is designated.

15. A facsimile communicating apparatus which can perform an alternate both-side transmission according to the ITU-T recommendation, wherein when a communication error occurs during transmission of a both-side document sheet, even if an error occurs in a reverse side, a re-transmission from a front side corresponding to the reverse side in which the error occurred is performed.

16. An apparatus according to claim 15, wherein as for the re-transmission when the communication error occurs in a page of a page number 2(n+1) (n is a positive integer) which is notified by a procedure signal, the transmission is performed from a page of a page number 2n+1.

17. An apparatus according to claim 15 or 16, wherein said apparatus has means for selecting whether the front side of a document sheet of a first page is transmitted or not as said error re-transmission, when the transmission of the front side of the document sheet of the first page is selected, the front side of the document sheet of the first page is re-transmitted, entirely blank data is subsequently transmitted as reverse side data, and thereafter, the re-transmission from the front side of the document sheet in which the error occurred is performed.

18. An apparatus according to claim 17, wherein a page number which is added to a same page changes depending on whether the front side of the document sheet of the first page is transmitted or not in the error re-transmission.

* * * * *

UNITED STATES PATENT AND TRADEMARK OFFICE
CERTIFICATE OF CORRECTION

PATENT NO. : 6,449,063 B1
DATED : September 10, 2002
INVENTOR(S) : Takehiro Yoshida et al.

It is certified that error appears in the above-identified patent and that said Letters Patent is hereby corrected as shown below:

Column 4,
Line 27, ""1"" should read -- ¶ "1" --.

Column 7,
Line 47, "1will" should read -- 1 will --.

Signed and Sealed this

Eleventh Day of February, 2003

JAMES E. ROGAN
*Director of the United States Patent and Trademark Office*